(12) United States Patent
Ihara

(10) Patent No.: US 6,268,898 B1
(45) Date of Patent: Jul. 31, 2001

(54) LIQUID CRYSTAL DISPLAY DEVICE AND METHOD OF MANUFACTURING THE SAME

(75) Inventor: Hirofumi Ihara, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/391,151

(22) Filed: Sep. 7, 1999

(30) Foreign Application Priority Data

Sep. 7, 1998 (JP) .................................................. 10-252663

(51) Int. Cl.[7] .......................... G02F 1/136; G02F 1/1343; G02F 1/1339
(52) U.S. Cl. .......................... 349/155; 349/42; 349/139; 349/149; 349/156
(58) Field of Search .............................. 349/42, 139, 149, 349/155, 156

(56) References Cited

U.S. PATENT DOCUMENTS

| | | | |
|---|---|---|---|
| 5,946,057 | * | 8/1999 | Kusanagi et al. ...................... 349/40 |
| 6,097,467 | * | 8/2000 | Fujimaki et al. ..................... 349/155 |
| 6,177,974 | * | 8/1999 | Hirakata et al. ..................... 349/155 |

FOREIGN PATENT DOCUMENTS

| | | |
|---|---|---|
| 58-100383 | 7/1983 | (JP) . |
| 3-58024 | 3/1991 | (JP) . |
| 6-289414 | 10/1994 | (JP) . |
| 7-159795 | 6/1995 | (JP) . |
| 8-327995 | 12/1996 | (JP) . |
| 2851310 | 11/1998 | (JP) . |

\* cited by examiner

Primary Examiner—William L. Sikes
Assistant Examiner—Julie Ngo

(57) ABSTRACT

A TFTs substrate in a liquid crystal display device, according to the present invention, is made up of a polarizing plate 102, a glass substrate 101, the first metal film 301, a gate insulating film 14, the second metal film 303, a transparent conductive film 306, and a passivation film 15. A color filter substrate 20 is made up of a facing electrode 22, a black matrix 23, a glass substrate 21, and a polarizing plate 25. The transparent conductive film 306 is electrically connected to the facing electrode 22 via a transfer column 24. The first metal film 301 is connected to the second metal film 303. The partial area of the first and second metal films 301 and 303 corresponding to a region where the transfer column is fixed, is removed.

4 Claims, 24 Drawing Sheets

LIQUID CRYSTAL DISPLAY DEVICE AND METHOD OF MANUFACTURING THE SAME

BACKGROUND OF THE INVENTION

1. Field of the Invention

The present invention relates to a liquid crystal display device. In particular, one where the existence or non-existence, shape, etc. of the transfer column can be observed without forming a monitoring window. The present invention also relates to a method of manufacturing the liquid crystal display device.

2. Prior Arts

Hereafter, the conventional liquid crystal display devices will be described with reference to the Figures.

FIG. 1 is an aerial view showing the configuration of the conventional liquid crystal display device from the viewpoint of the display surface side, and FIG. 2 is an equivalent circuit diagram illustrating the structure outline of this type of liquid crystal display device.

As shown in FIG. 1, the active matrix-type liquid crystal display device, which uses Thin-Film Transistors (hereafter, TFTs) as switching elements, is composed of a TFTs substrate 100 and a color filter substrate 20. Wherein, the TFTs substrate 100 has TFTs and pixel electrodes 30 arranged in matrix form, whereas the color filter substrate 20 is made of a shielding film (namely a black matrix) 23, a coloring layer, and a common electrode. The above two substrates 100 and 20 face each other across a liquid crystal.

In FIG. 2, reference numeral 41 depicts gate lines or scanning lines driven by a gate bus line driver (not shown in the Figure), which is connected to the gate terminals 31. Reference numeral 42 depicts drain bus lines or signal lines driven by a drain bus driver (not shown in the Figure), which is connected to the drain terminals 32. Reference numeral 47 depicts TFTs, where their gates are connected to the gate bus line 41, and their drains are connected to the drain bus lines 12. Reference numeral 46 depicts pixel electrodes, which are connected to the respective TFTTs 47, and which are formed of a transparent conductive film such as ITO.

The area of a color filter substrate 20 is overlapped with a partial area of the TFTs array substrate 100, wherein the substrates 20 and 100 face each other across a liquid crystal, as is mentioned above.

Each accumulation capacitor element 45 and liquid crystal capacitor element 44, are connected parallel to each other. In addition, they are connected to their corresponding TFT 47 in series. Each accumulation capacitor element 45 is formed of a pixel electrode 46 and an accumulation capacitor electrode (not shown in the Figure), where an insulating film is sandwiched between these electrodes. Whereas, each liquid crystal capacitor element 44 is formed of a pixel electrode 46 and an electrode (not shown in the Figure) facing the electrode 16, which is located on the surface of the color filter substrate 20; wherein the liquid crystal is sandwiched between the above two electrodes. In result, the common voltage, which is input from the common voltage input terminals 33 and formed on the surface of the TFTs array substrate 100, is supplied from the transfer pads to the respective, facing electrodes via the transfer columns 27.

The structure and manufacturing method of the representative conventional TFTs array substrate will be described with reference to FIGS. 3 and 4.

FIG. 3 is an aerial view showing the structure of a pixel section, according to the first example of conventional TFTs array substrates, and FIG. 4 is a cross section of FIG. 3 cut along the line of A–A'.

In FIGS. 3 and 4, first of all, a gate electrode 1, a gate bus line 11 (see FIG. 3) and an accumulation capacitor electrode are formed on top of the glass substrate 101 by patterning the first metal film, made of a metal such as Cr or Al. In addition, in FIG. 3, a part of the gate bus line 11 also acts as an accumulation capacitor electrode. Afterwards, a gate insulating film 14, made of a material such as silicon oxide film or silicon nitride film; a channel layer 2, made of intrinsic semiconductor non-crystalline silicon (hereafter, [a-Si (I)]); and a contact layer 7, made of n-type semiconductor non-crystalline silicon (hereafter, [a-Si (n+)]), are successively formed. Next, the patterning process etches off part of the gate insulating film 14; wherein, the part corresponds to the regions (not shown in the Figures) where terminals used for interfacing with a driver IC are to be formed. Then, a through-hole (not shown in the Figures), which is used to electrically interface a first metal film comprising the gate electrode 1 with a second metal film (where a drain electrode 3, a source electrode 4, and a drain bus line 12 are to be formed from this second metal film later), is formed. Afterwards, in the same way as the gate electrode 1, the second metal film, made of a metal such as Cr or Al, is patterned, so as to form the drain electrode 3, the source electrode 4, and the drain bus line 12. A transparent conductive film consisted of a transparent conductive material such as ITO, is formed as a pixel electrode 6. Subsequently, the contact layer 7 is etched, so as to remove part of its area on top of the channel layer 2. Afterwards, by the formation of a passivation film 15, which is made of a material such as silicon nitride, the TFTs array substrate 100 is completed. It is noted that the passivation film 15 located on top of the pixel electrode 6 is removed, in order to prevent a drop in device transmittance, namely a drop in brightness of the display, which causes the absorption of light for the passivation film 15. That is to say, as shown in FIGS. 3 and 4, a passivation film aperture region is provided to cover almost the entire surface of the pixel electrode 6.

Next, the structure and manufacturing method of the transfer pad, which is formed on top of the first example of conventional TFTs array substrates, will be explained hereafter, with reference to the Figures.

FIG. 5 is an aerial view showing the configuration of the transfer pad formed on top of the first example of conventional TFTs array substrates, and FIG. 6 is a cross section of FIG. 5 cut along the line of A–A'. The manufacturing method and process described below, is the same as the TFTs array substrate described earlier with reference to FIGS. 3 and 4.

In FIGS. 5 and 6, first of all, a first metal film 301, which is made of a metal such as Cr or Al, is formed. It is then patterned into the shape of a transfer pad. Afterwards, a gate insulating film 14, made of a material such as silicon oxide or silicon nitride, is formed on top of the glass substrate 101. Then, a patterning process etches off a predetermined area of the gate insulating film 14 on top of the first metal film 301, so as to form the through hole 9, which is used to electrically interface the first metal film 301 with the second metal film 303. Next, the second metal film 303, made of a metal such as Cr or Al, is patterned into a fixed shape in the same way as the first metal film 301. Next, the transparent conductive film 306, made of a transparent conductive material such as ITO, is formed on top of the second metal film 303 mentioned above. Subsequently, through the formation of the passivation film 15, made of a material such as silicon nitride, the transfer pad is formed. At this point, the passivation film 15, located on the surface of the transparent conductive film 306, is removed to electrically connect the transfer pad and transfer column 24. Namely, as shown in FIGS. 5 and 6, the aperture region of the passivation film 15 is provided on top of the transparent conductive film 306. This transfer pad is connected to the common voltage input terminal 33 (see FIGS. 1 and 2), via one or both of the first or second metal films 301 and 303.

In the first example of conventional TFTs array substrates, previously described with reference to FIGS. 3 and 4, the drain bus line 12 and the pixel electrode 6 are both formed on top of the gate insulating film 14. That is to say, they are both formed on the same plane, and are adjacent to each other at a certain interval. Therefore, when a bad pattern results from the patterning process, the drain bus line 12 and the pixel electrode 6 are apt to short. When there is a short in the drain bus line 12 and the pixel electrode 6, the charge and discharge in the pixel electrode 6 cannot be controlled by turning on or off its corresponding TFT, and this pixel is registered as a point defect.

In result a TFTs structure, which reduces the potential for the drain bus line 12 and the pixel electrode 6 to short, is proposed.

This TFT will be explained hereafter, with reference to the Figures, as the second example of conventional TFTs array substrates.

FIG. 7 is a plan illustrating the structure of a pixel section of the second example of conventional TFTs array substrates, whereas FIG. 8 is a cross section of FIG. 7 cut along the line A–A'.

Hereafter, the manufacturing method of the TFTs array substrate will be described with reference to the Figures.

In FIGS. 7 and 8, first of all, a gate electrode 1, a gate bus line 11 and an accumulation capacitor electrode are formed on the surface of the glass substrate 101 by patterning a first metal film, made of a metal such as Cr or Al. In addition, in FIG. 7 and as in FIG. 3, a part of the gate bus line 11 also acts as an accumulation capacitor electrode. Afterwards, a gate insulating film 14, made of a material such as silicon oxide or silicon nitride, a channel layer 2, made of a-Si (I), and a contact layer 7, made of a-Si (n+) are successively formed. Next, the gate insulating film 14 is patterned, so as to etch off part of it, wherein, the part corresponds to the areas of prospective terminals that will be formed later in order to interface with a driver IC. Through the patterning process, a through-hole (not shown in the Figures), which is used for electrically connecting the first metal film comprising a gate electrode 1, to the second metal film, is formed. Afterwards, in the same way as the gate electrode 1, the second metal film made of a metal such as Cr or Al is patterned, so as to form a drain electrode 3, a source electrode 4 and a drain bus line 12. Subsequently, a contact layer 7 on top of the channel layer is partially etched off. On top of this, after the formation of a passivation film 15, a through-hole 10 is then formed, so as to electrically connect a to-be-formed pixel electrode 6 to the source electrode 4, made of the second metal film. Thereafter, the pixel electrode 6 is formed on top of the resulting surface, so as to complete forming TFTs array substrate 100. Also, the necessary number of patterning steps for this structure described is the same as for the structure described with reference to FIGS. 3 and 4.

In the structure of one pixel of the second example of conventional TFTs, the drain bus line 12 is formed on top of the gate insulating film 14, and on the other hand, the pixel electrode 6 is formed on top of the passivation film 15. The passivation film 15 or insulating film, formed between the drain bus line 12 and the pixel electrode 6, prevents an occurrence of a short circuit between them, even if they are imperfectly patterned. Thus, bad point defects are reduced.

Next, the structure of the transfer pad, which is formed on the second example of conventional TFTs array substrates, will be described hereafter, with reference to the Figures.

FIG. 9 is a plan of a transfer pad, which is formed on the first example of conventional TFTs array substrates, whereas FIG. 10 is a cross section of FIG. 9 cut along the line A–A'. FIG. 11 is a plan of a transfer pad, which is formed on the second example of conventional TFTs array substrates, whereas FIG. 12 is a cross section of FIG. 11 cut along the line A–A'. The manufacturing method and process described below, is the same as for the TFTs array substrate previously described with reference to FIGS. 7 and 8.

To start, the first example of the structure of a transfer pad will be described.

As shown in FIGS. 9 and 10, the first metal film, made of a metal such as Cr or Al, is formed on top of the glass substrate 101. It is then patterned into the fixed shape of a transfer pad. The gate insulating film 14 made of a material such as silicon oxide or silicon nitride is formed next. Subsequently, the passivation film 15, made of a material such as silicon nitride, is formed. Then, in order to electrically connect the first metal film 301 to the transparent conductive film 306, both the gate insulating film 14 and the passivation film 15, located on the first metal film 301, are partially etched off, so as to form the through-hole 10 (see FIG. 11). Next, the transparent conductive film 306, made of a transparent conductive material such as ITO, is formed on top of the aforementioned first metal film 301. As a result, the fabrication of a transfer pad is completed. This transfer pad is connected to the common voltage input terminal 33, via the first metal film 301.

Next, the second example of the structure of a transfer pad will be described.

As shown in FIGS. 11 and 12, a gate insulating film 14, made of a material such as silicon oxide and silicon nitride, is formed on top of a glass substrate 101. A second metal film 303, made of a metal such as Cr or Al, is formed on the resulting surface. It is then patterned into the fixed shape of a transfer pad, and then a passivation film 15, made of a material such as silicon nitride, is formed. Here at the same time, in order to electrically connect the second metal film 303 to a to-be-formed transparent conductive film 306, the passivation film 15, located on top of the second metal film 303, is partially etched off. Next, the transparent conductive film 306, made of a transparent conductive material such as ITO, is formed on top of the aforementioned second metal film 303. In result, the fabrication of the transfer pad is completed. This transfer pad is connected to the common voltage input terminal 33, via the second metal film 303.

Next, the manufacturing method of the liquid crystal display device, which uses the previously described first and second examples of conventional TFTs array substrates, will be described with reference to the Figures.

In FIG. 12, the color filter substrate 20 is composed of the glass substrate 21; the black matrix 23, which is made of a metal such as Cr or CrOx, and black resin, on the surface of the substrate 21; and a coloring layer (not shown in the Figure). Wherein, in order to confirm the existence or non-existence and shape of the transfer column, a part of the black matrix 23 is removed, so as to form a transfer column-monitoring window (see FIG. 1). A facing electrode 22, made of a transparent conductive film material such as ITO, is formed on the resulting surface. In result, the fabrication of a color filter substrate 20 is completed.

An orientation processing film (not shown in the Figure) is formed on each of the surfaces of the TFTs array substrate 100 and color filter substrate 20. Next, a seal (not shown in the Figure) made of an adhesive, is formed along the rim of the outer area of the color filter substrate 20. A transfer column 24, made of a material such as silver paste, is then formed in the four corners of the color filter substrate 20. In addition, the transfer column 24 is formed in order for the transfer pad, which is formed on top of the TFTs array substrate, and the facing electrode 22, formed on the surface of the color filter substrate, to be electrically connected to each other. Subsequently, the two substrates mentioned above are adhered at a fixed distance apart. Liquid crystal (not shown in the Figure) is then injected in between them, and is sealed shut. In result, the liquid crystal display device is completed.

Thereafter, a driving circuit, a case (not shown in the Figure), etc, are added to the polarizing plates 25 and 102 of the liquid crystal display device. In this case, the display is viewed from the glass side of the color filter substrate 20.

As mentioned above, in order to confirm the existence or non-existence and shape of the transfer column 24, a part of the black matrix 23 is removed, so as to form the transfer column-monitoring window 26. In result, the quality resulting from fabricating the transfer column 24 can be easily observed, even after the fabrication of the liquid crystal display device.

Nowadays, in order to control the drop in the image display quality, resulting from reflection off the surface of the liquid crystal display, low reflectance of the black matrix, which is made of CrOx and black resin, and such technology as low reflection processing of the polarizing plate 25, are adopted. In this case, there is a problem of dropping the quality of appearance of the liquid crystal display surface. That is to say, a problem in which the surface of the transfer column 24 can be clearly seen out of the transfer column-monitoring window, which is formed on the black matrix 23, from the viewpoint of the glass side of the display, namely the color filter substrate 20, as a displayed image is also seen at the same time. This emanates from the fact that the transfer column 24 made of material such as silver paste, which compared to the black matrix 23 and polarizing plate 25, has a relatively high reflection factor.

Furthermore, as a patent example concerning the structure of the transfer pad, the Japanese Patent Applications Laid-open Nos. Hei-8-327995 and Hei-7-159795 are open to the public.

The structure of the transfer pad presented in the Japanese Patent Application Laid-open No. Hei-8-327995) follows the structure mentioned above, except that a transfer column-monitoring window is not formed on the black matrix. Therefore, since the transfer column is not visible from the display side of the liquid crystal display panel, there is the problem of not being able to confirm the existence or non-existence and shape of the transfer column after having fabricated the liquid crystal display device.

Even though the techniques for decreasing poorly-formed seals and transfer columns are proposed in the Japanese Patent Application Laid-open No. Hei-7-159795, by having a guiding ditch formed in the region where the seals and transfer columns are formed, it does not have any relevance to the problems that are to be solved with the present invention.

SUMMARY OF THE INVENTION

The objective of the present invention, considering the problems of the aforementioned conventional technology, is to propose a liquid crystal display device where the existence or non-existence and shape of the transfer column is observable after the fabrication of the liquid crystal display device, and at the same time, prevents the depreciation of appearance of the liquid crystal display surface, which is due to the reflection of the transfer column.

To obtain the above objective, the present invention is structured to form a transfer column-monitoring window at the glass side of the TFTs array substrate. This is done through the removal of the metal film, located in the region corresponding to the center of the metal film, which comprises a transfer pad on top of the TFTs array substrate, namely the region where the transfer column is to be formed. In addition, without forming a monitoring window on the black matrix, which is formed on the surface of the color filter almost all of the outer parts of the display area of the liquid crystal display device can be shaded.

According to an aspect of the present invention, a liquid crystal display device is provided, comprising a conductive film (301) on a substrate (101), wherein the area of the conductive film (301) corresponding to a region where a transfer column is formed, is removed; and a transparent conductive film (306) on the substrate. An example of the liquid crystal display device is illustrated in FIG. 17. The above reference numerals put in the parentheses are attached to respective corresponding elements in FIG. 17.

According to an aspect of the present invention, a liquid crystal display device is provided, comprising a conductive film (301) on a substrate (101), wherein a partial area of the conductive film (301) corresponding to a region where a transfer column is formed, is removed, so as to be shaped into a vernier scale; and a transparent conductive film (15) on the substrate. An example of the liquid crystal display device is illustrated in FIGS. 20 and 21.

According to an aspect of the present invention, a method of manufacturing a liquid crystal display device is provided, comprising a first step of forming a conductive film (301) on top of a substrate (101), and then removing an area of the conductive film (301) corresponding to a region where a transfer column is to be formed; and a second step of forming a transparent conductive film (306) on the resulting surface from the first step. An example of the liquid crystal display device is illustrated in FIGS. 17 and 23.

According to an aspect of the present invention, the first step forms a conductive film (301) on top of a substrate (101), and then removing a predetermined area of the conductive film (301), corresponding to a region where a transfer column is to be formed, so as to form a vernier scale. An example of the formation of the vernier scale is illustrated in FIG. 20.

According to an aspect of the present invention, a method of manufacturing a liquid crystal display device is provided, comprising a first step of forming a conductive film (301) on top of a gate insulating film (14), which is formed on top of a substrate (101), and then removing an area of the conductive film (301), corresponding to a region where a transfer column is to be formed; and a second step of forming a transparent conductive film (306) on the resulting surface from the first step. An example of the above method of manufacturing a liquid crystal display device is illustrated in FIGS. 19 and 24.

According to an aspect of the present invention, the first step forms a conductive film (301) on top of a gate insulating film (14), which is formed on top of a substrate (101), and then removes a predetermined area of the conductive film (301), corresponding to a region where a transfer column is to be formed, so as to form a vernier scale. An example of the above method of manufacturing a liquid crystal display device is illustrated in FIG. 20.

BRIEF DESCRIPTION OF THE DRAWINGS

The above and other objects, features and advantages of the present invention will become apparent in the embodiment section from the following detailed description, when taken in conjunction with the accompanying drawings, wherein.

DETAILED DESCRIPTION OF THE PREFERRED EMBODIMENTS

The embodiments of the present invention will be described with reference to the Figures.

(First Embodiment)

Hereafter, a transfer pad formed on top of a TFTs array substrate, and a liquid crystal display device, according to the first embodiment of the present invention, will be described.

Figure 1:
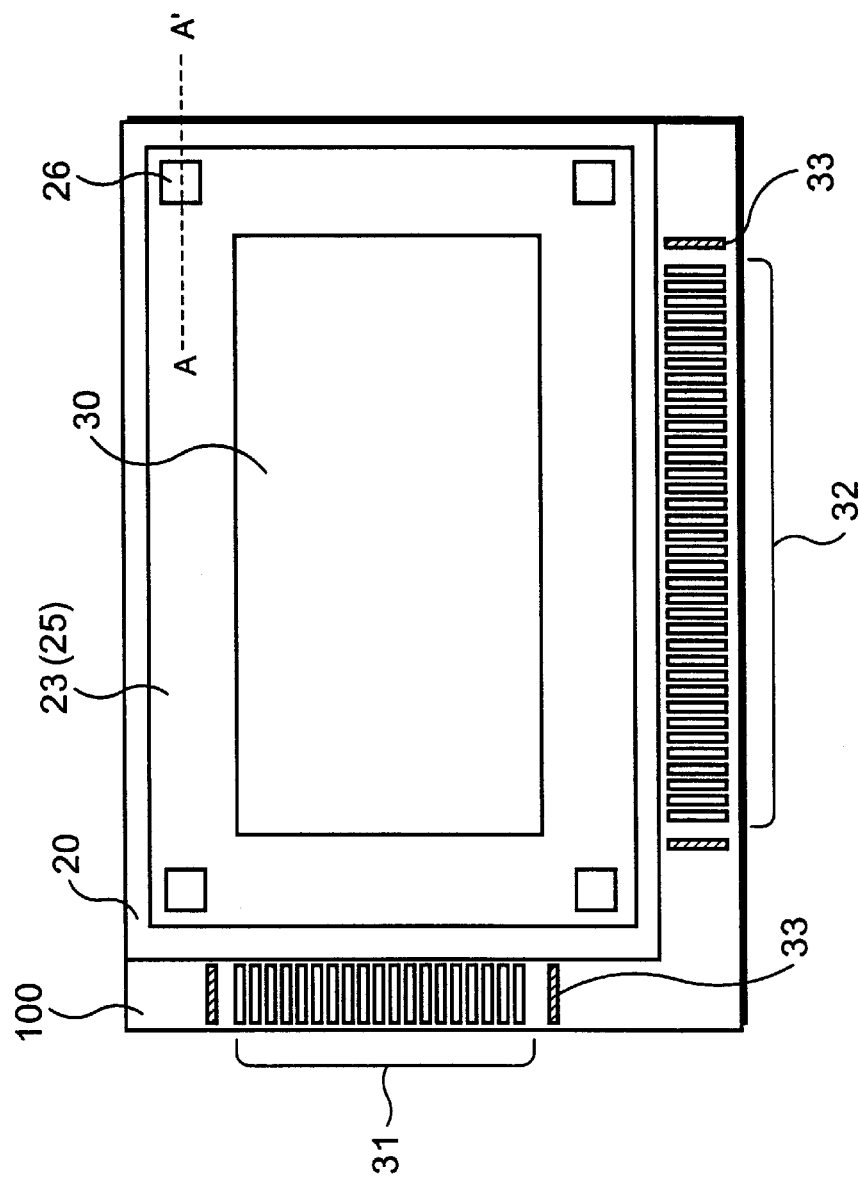
FIG. 1 is an aerial view showing the conventional liquid crystal display device viewed from the side of the display surface.
Figure 2:
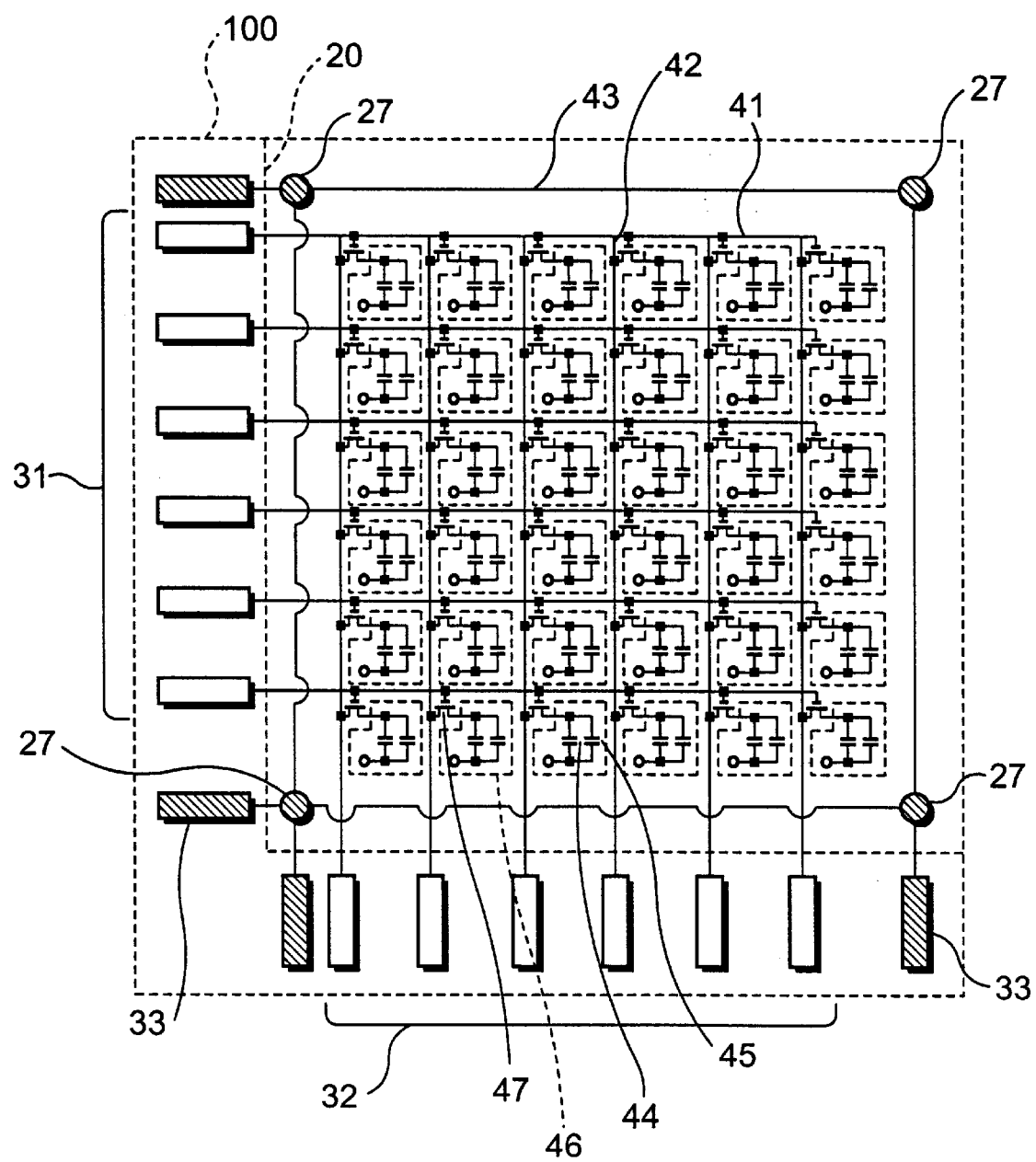
FIG. 2 is an equivalent circuit diagram outlining the structure of the conventional liquid crystal display device.
Figure 3:
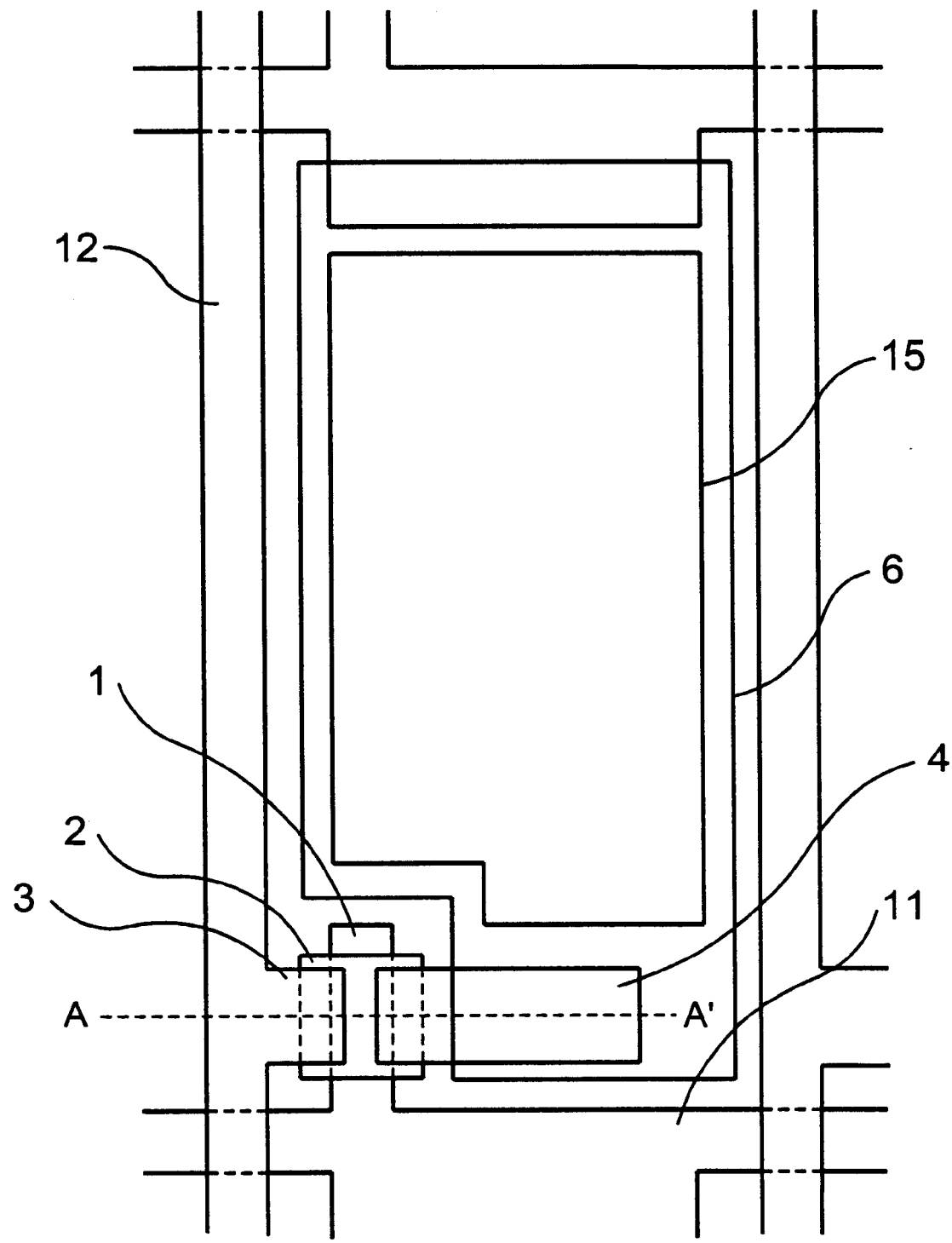
FIG. 3 is a plan illustrating the structure of a pixel formed on the first example of conventional TFTs array substrates.
Figure 4:
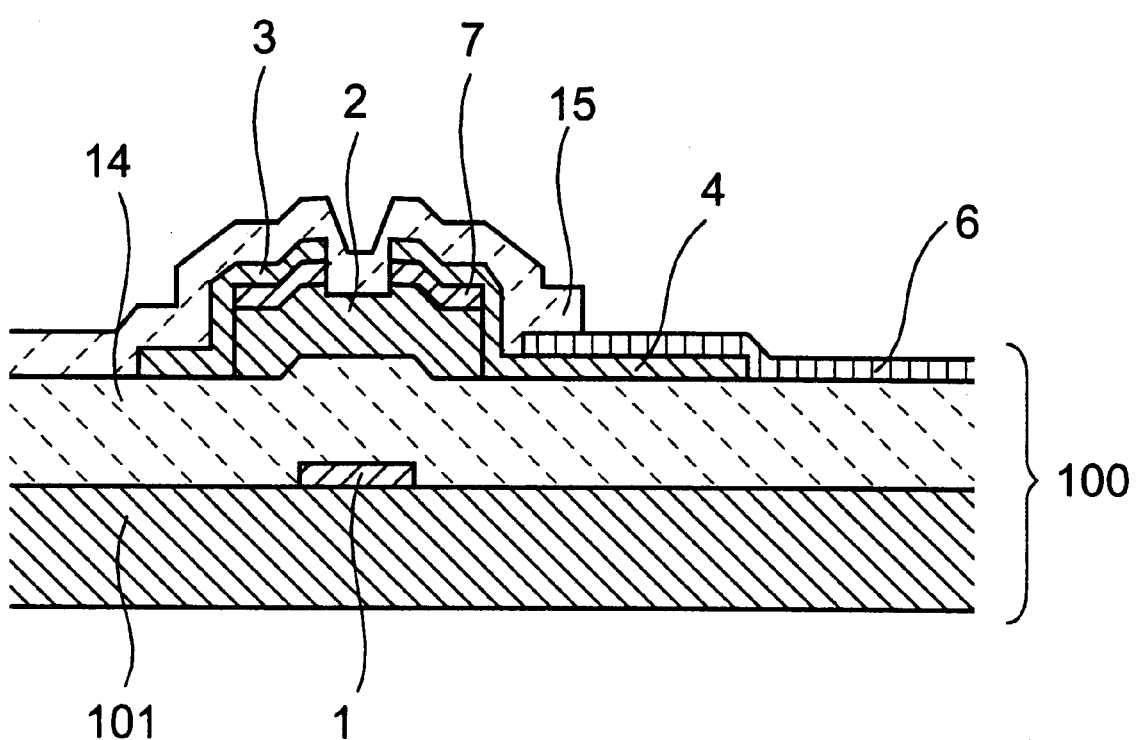
FIG. 4 is a cross section of the TFT of FIG. 3 cut along the line A–A'.
Figure 5:
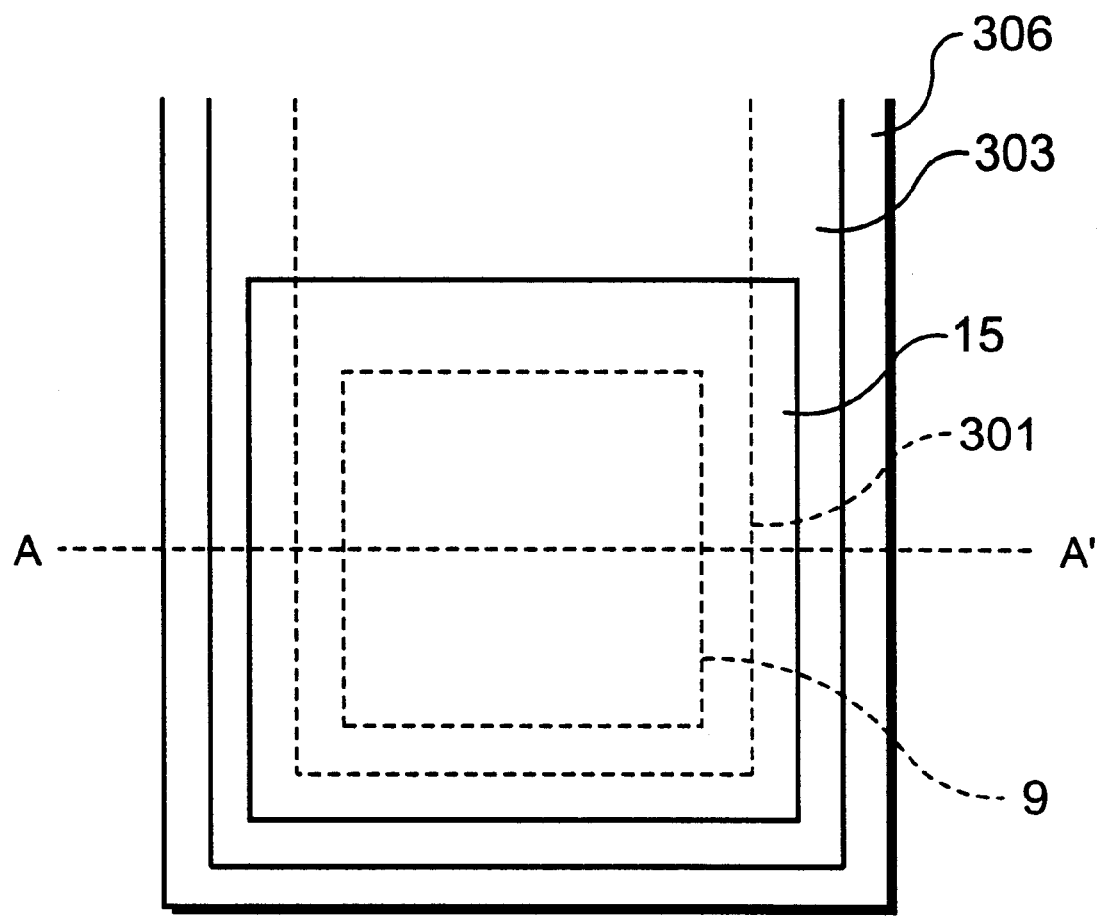
FIG. 5 is a plan of the transfer pad formed on the first example of conventional TFTs array substrates.
Figure 6:
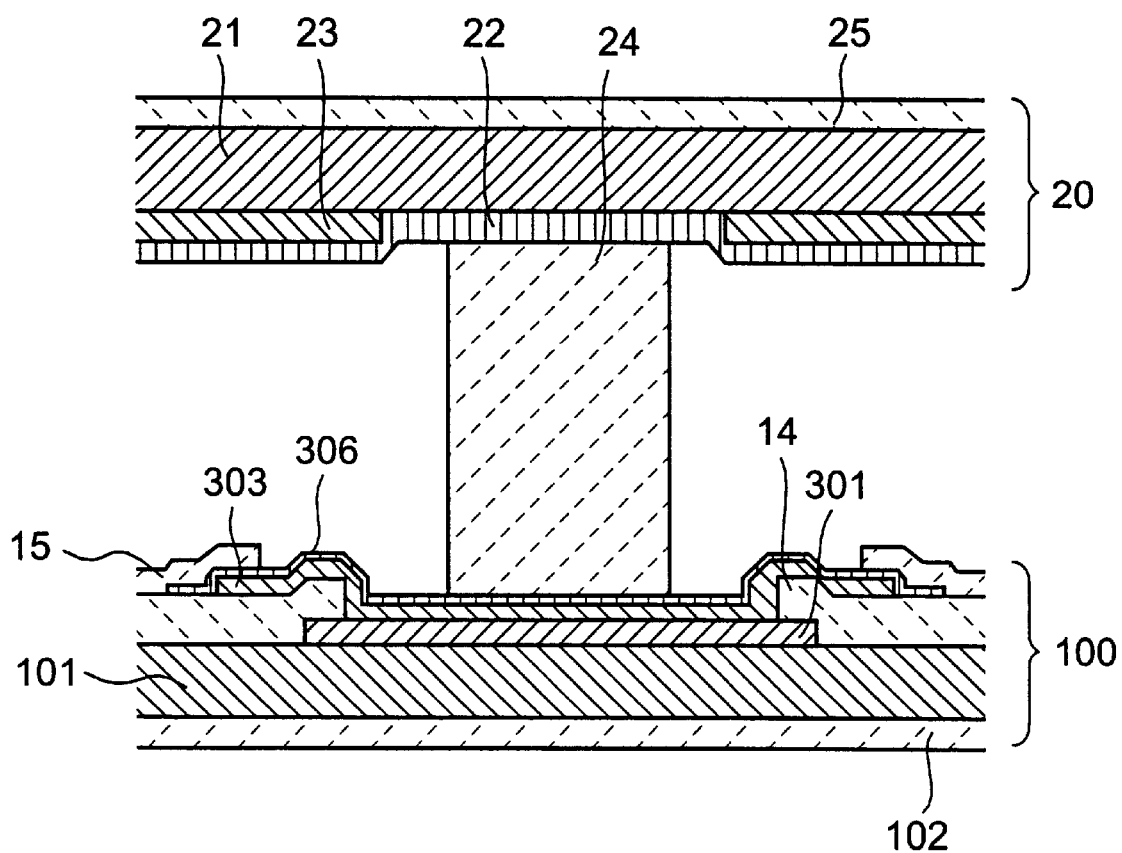
FIG. 6 is a cross section of FIG. 5 cut along the line A–A'.
Figure 7:
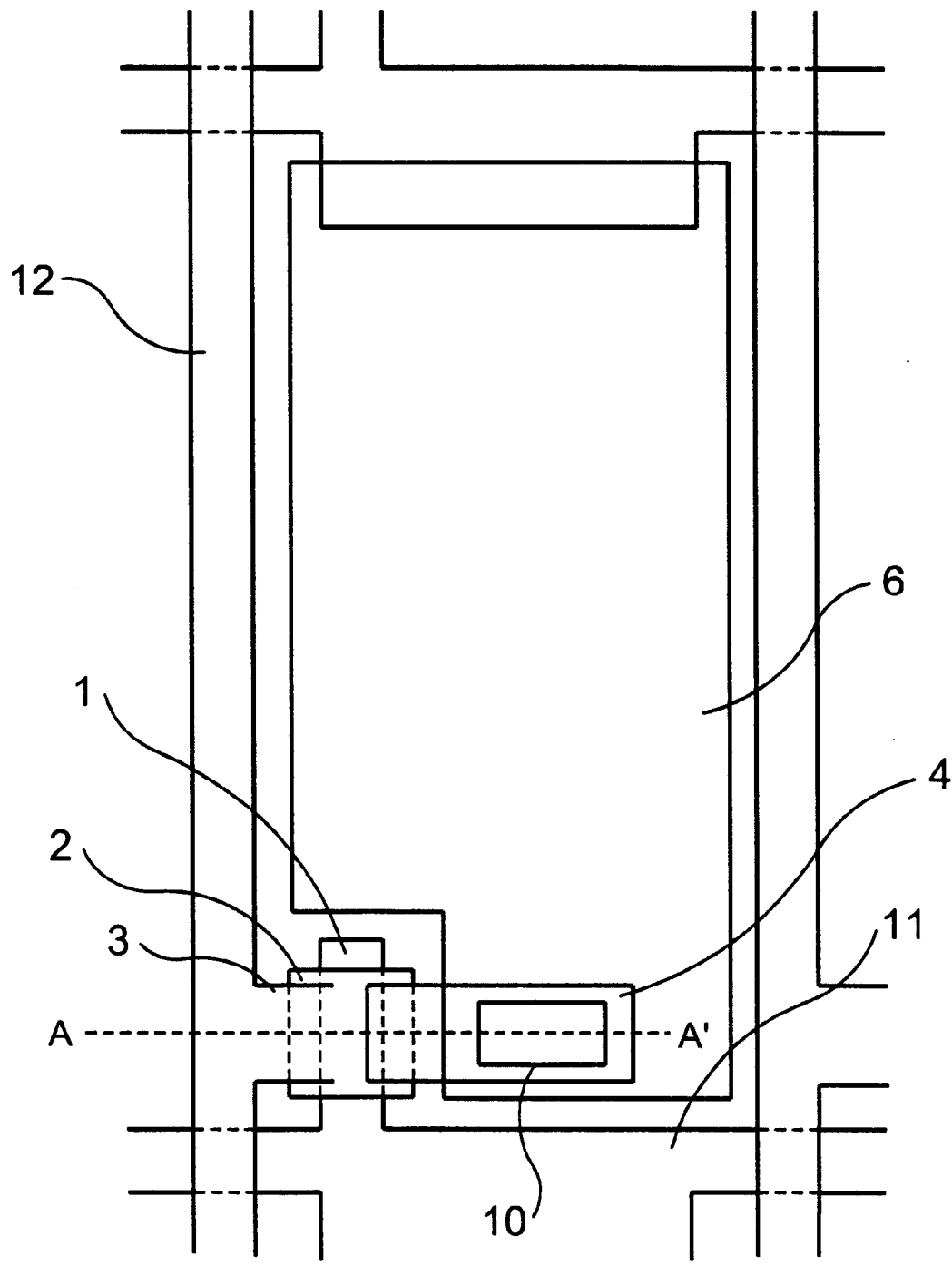
FIG. 7 is a plan illustrating the structure of a pixel formed on the second example of conventional TFTs array substrates.
Figure 8:
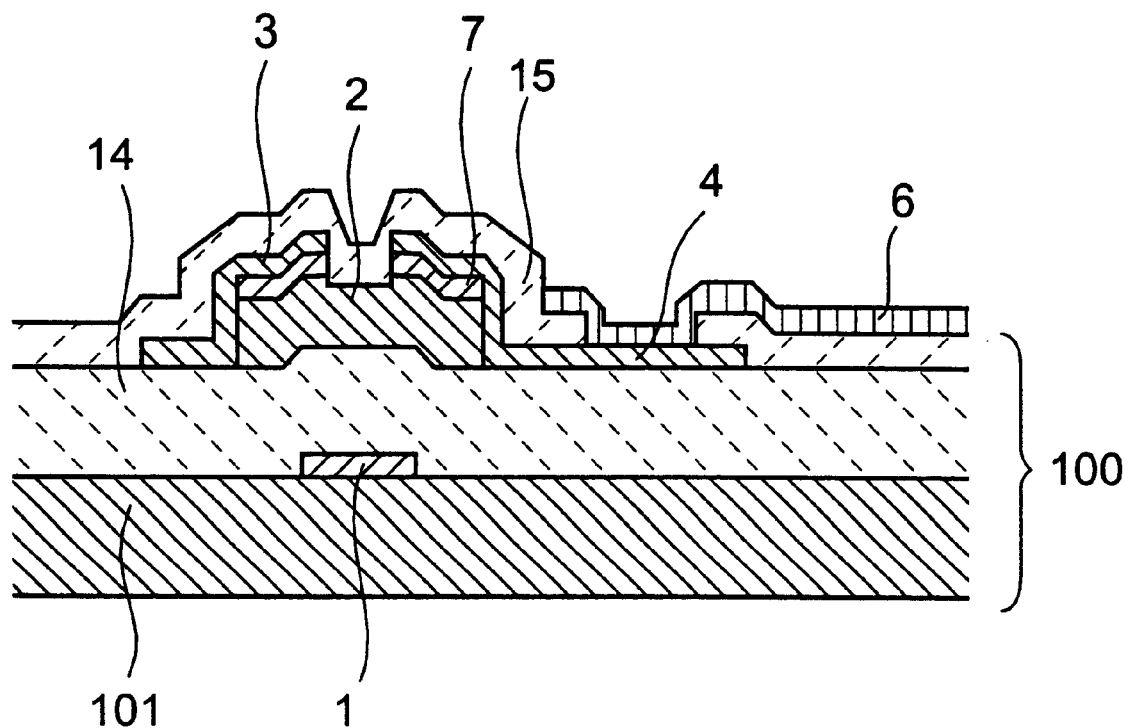
FIG. 8 is a cross section of the TFT of FIG. 7 cut along the line A–A'.
Figure 9:
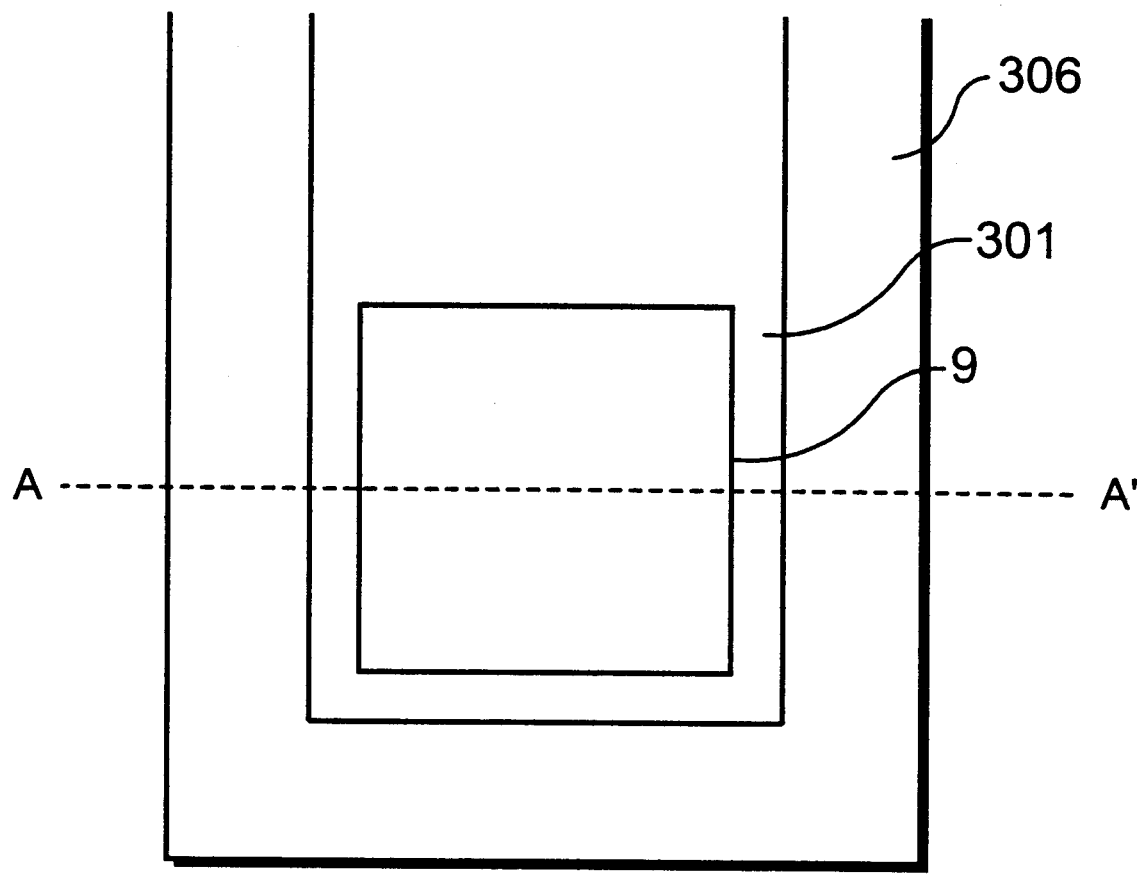
FIG. 9 is a plan of the transfer pad (first example) formed on the second example of conventional TFTs array substrates.
Figure 10:
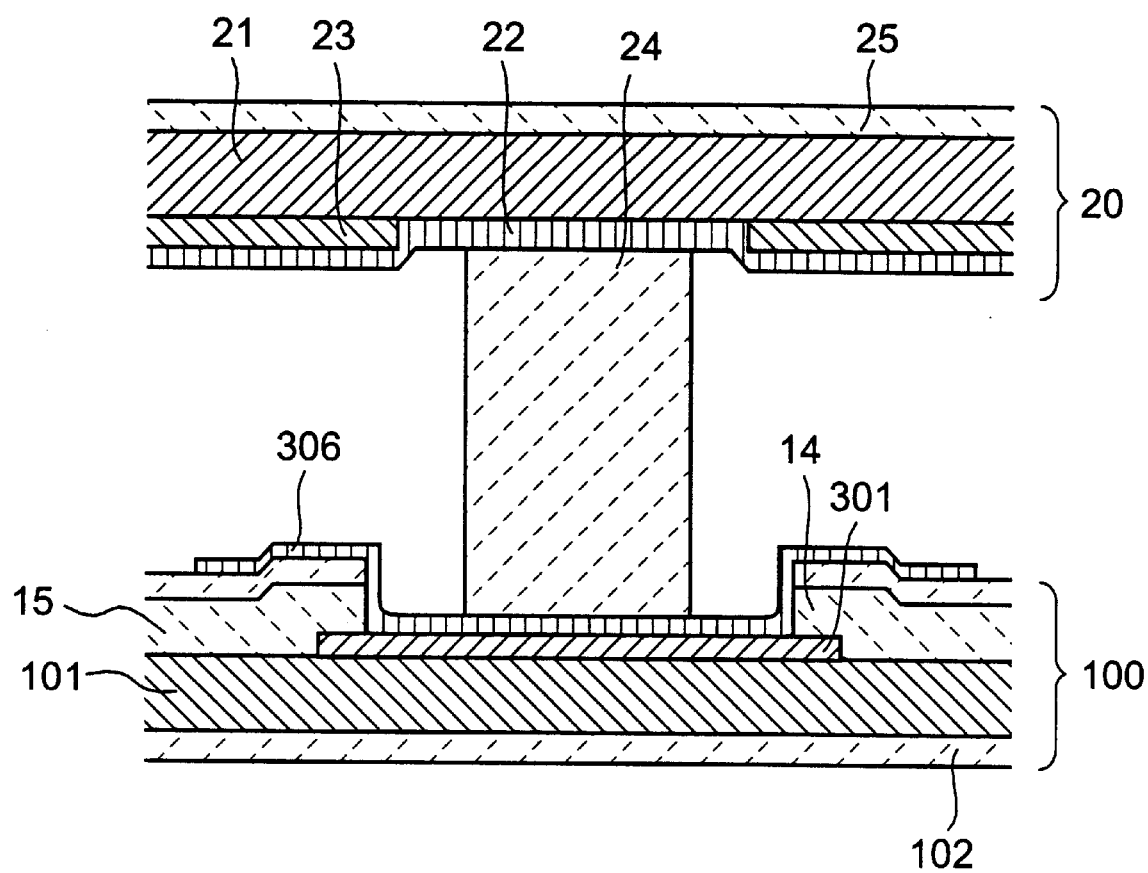
FIG. 10 is a cross section of FIG. 9 cut along the line A–A'.
Figure 11:
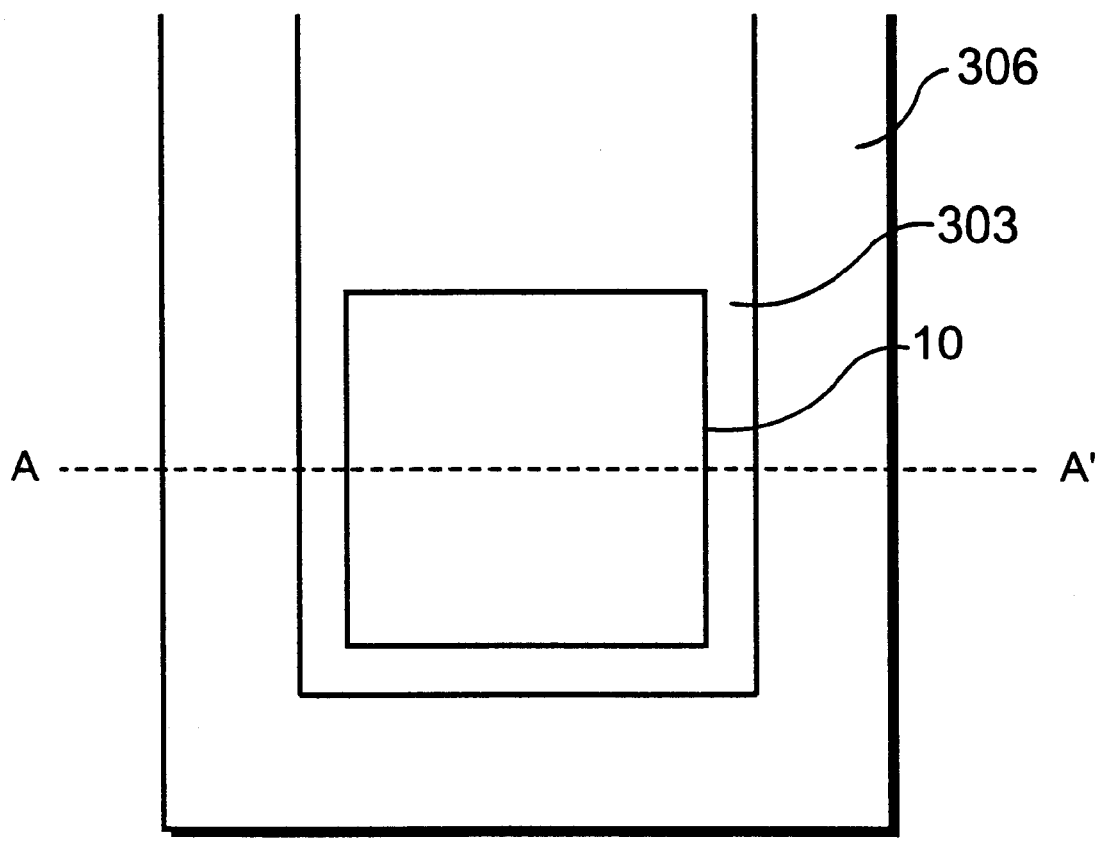
FIG. 11 is a plan of the transfer pad (second example) formed on the second example of conventional TFTs array substrates.
Figure 12:
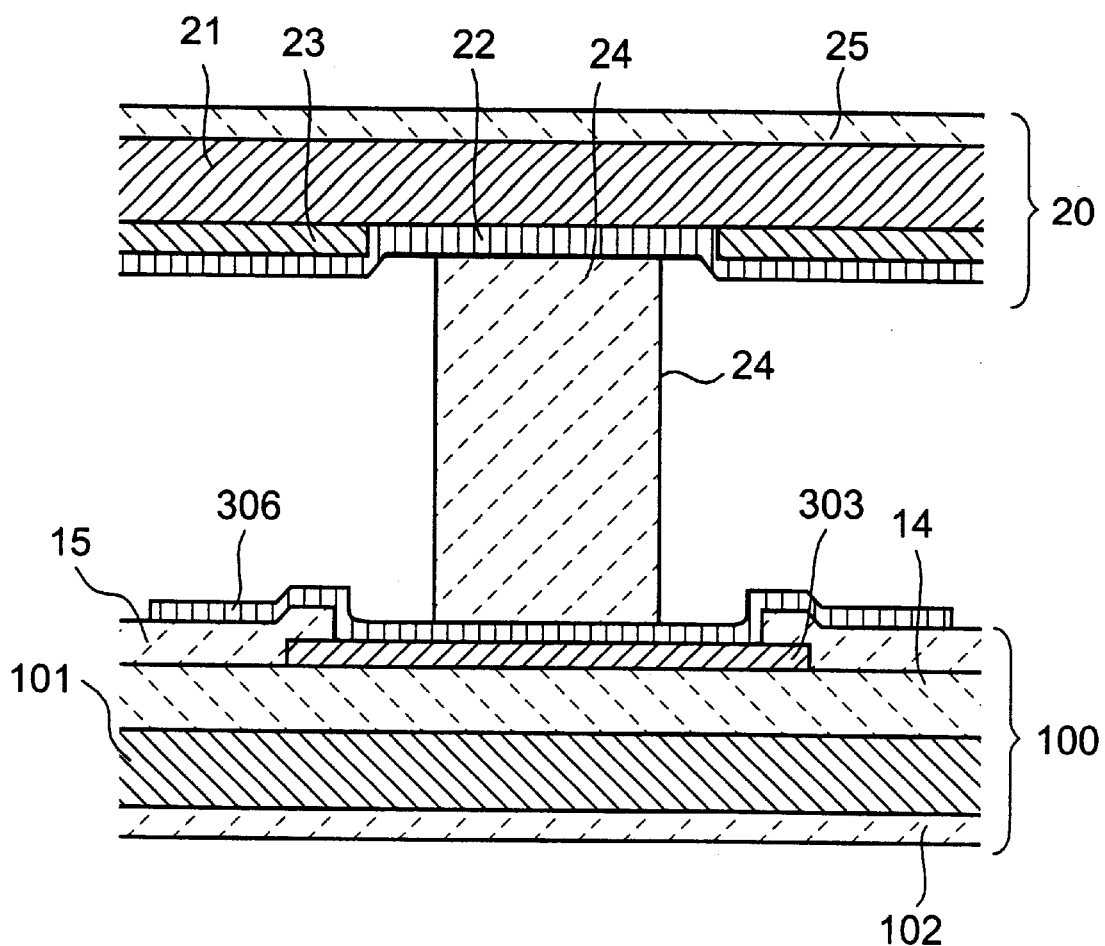
FIG. 12 is a cross section of FIG. 11 cut along the line A–A'.
Figure 13:
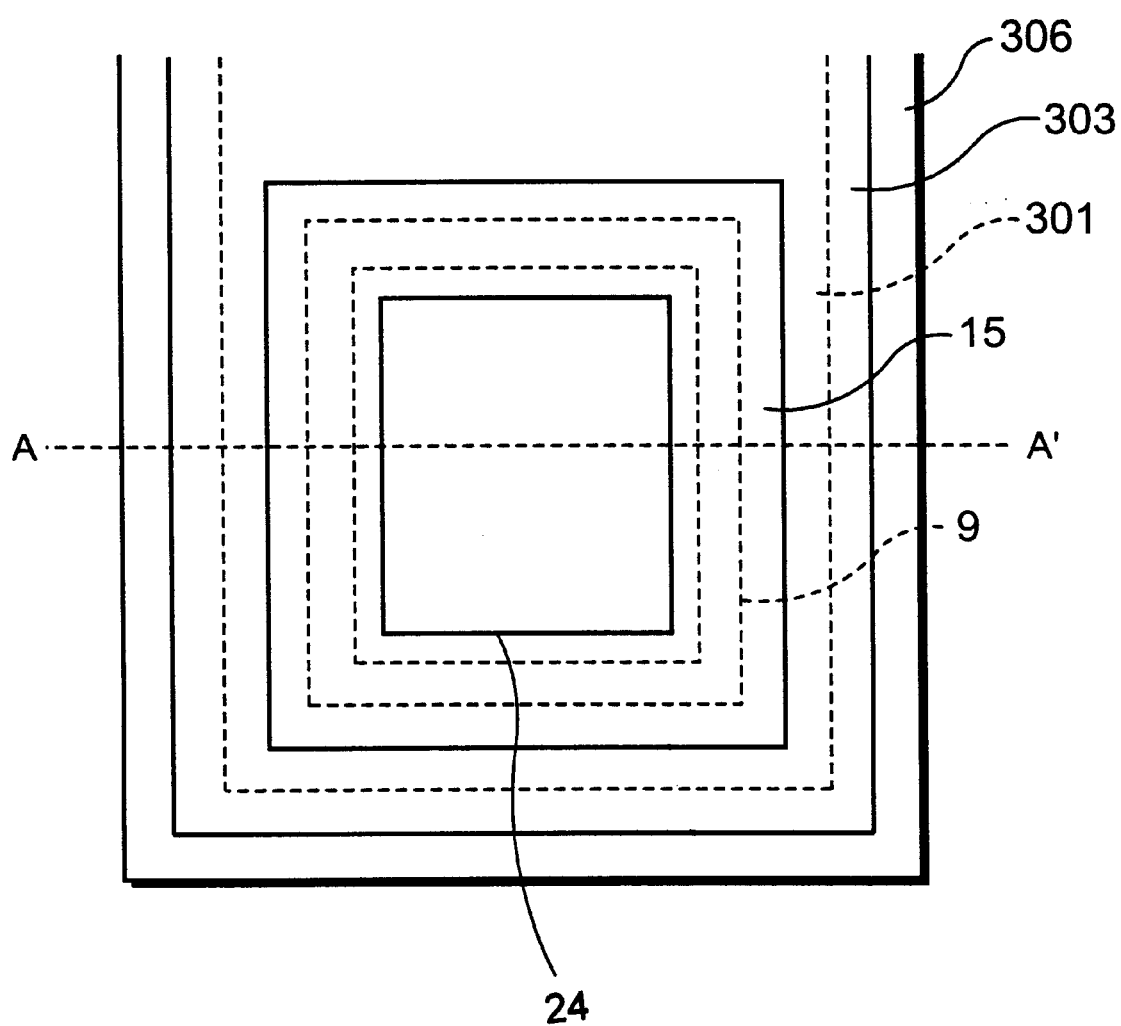
FIG. 13 is a plan illustrating the structure of the transfer pad, formed on the TFTs array substrate, according to a first embodiment of the present invention.
Figure 14:
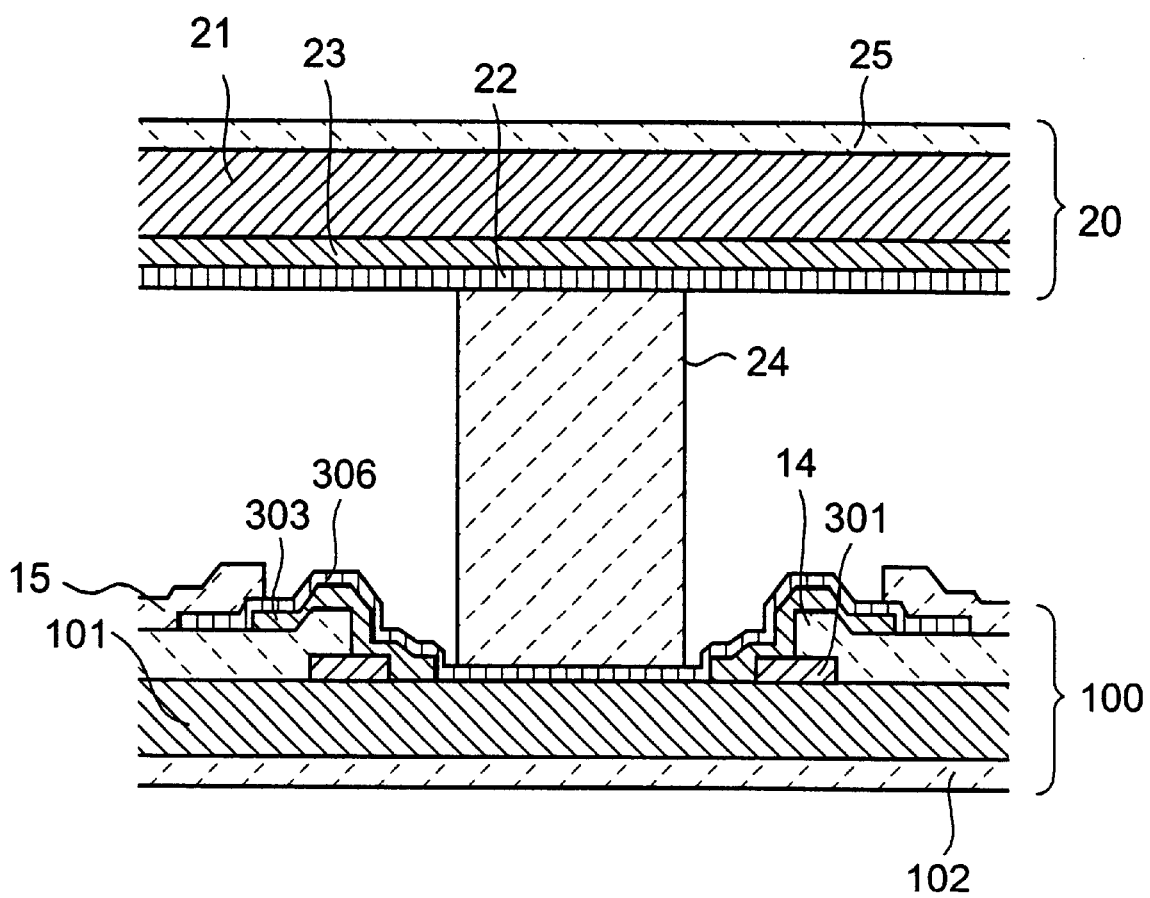
FIG. 14 is a cross section of FIG. 13 cut along the line A–A'.
Figure 15:
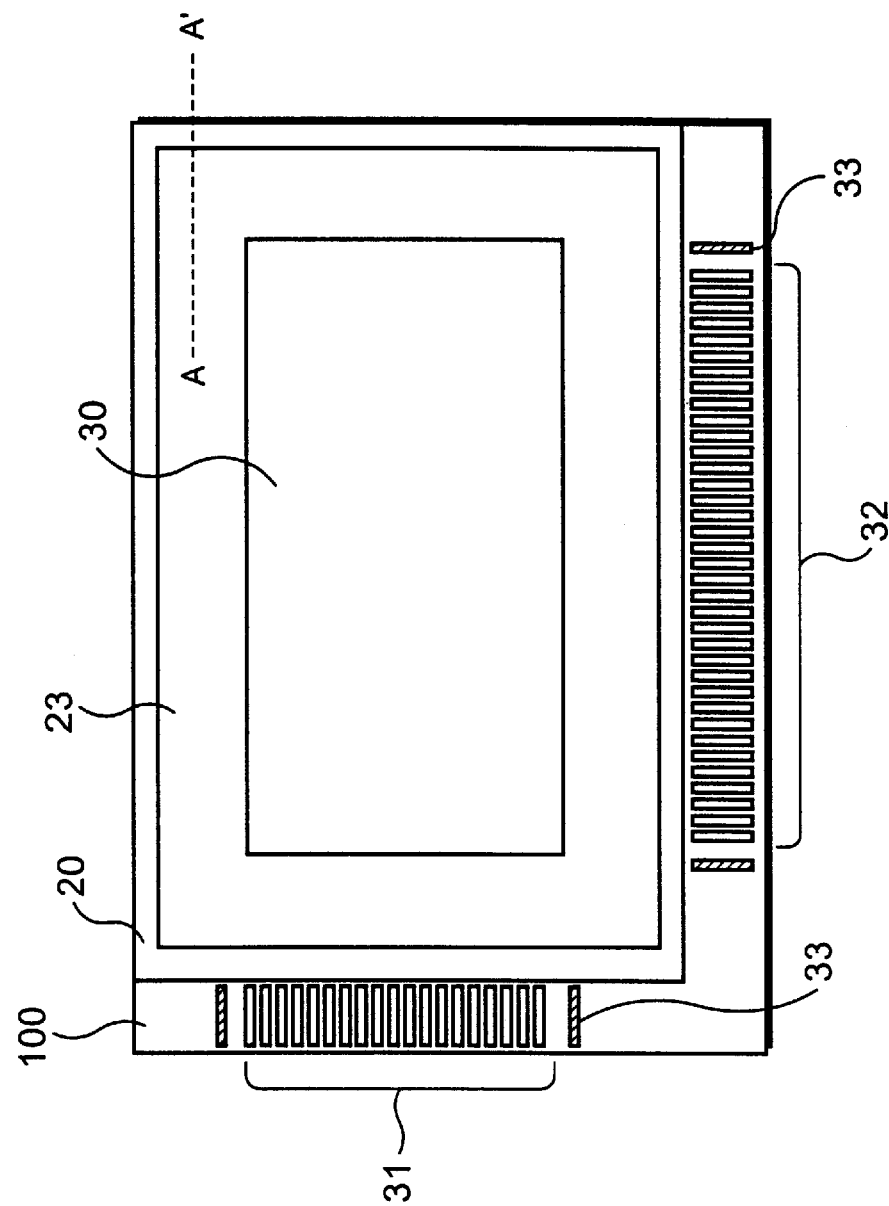
FIG. 15 is a plan of the liquid crystal display device, according to the present invention, viewed from the side of the display surface.

FIG. 13 is a plan illustrating the structure of the transfer pad, formed on top of the TFTs array substrate, according to the first embodiment of the present invention. FIG. 14 is a cross section of FIGS. 13 and 15 cut along the line A–A'. FIG. 15 is a plan of the liquid crystal display device viewed from the glass side of the color filter substrate, namely, the display side of the liquid crystal display device, according to the present invention.

First, the manufacturing method and structure of the transfer pad, formed on top of the TFTs array substrate, will be described with reference to FIGS. 13, 14, and 22. It is noted that the TFTs and transfer pads are both formed on the surface of the TFTs array substrate by using the same materials and patterning process.

Figure 22:
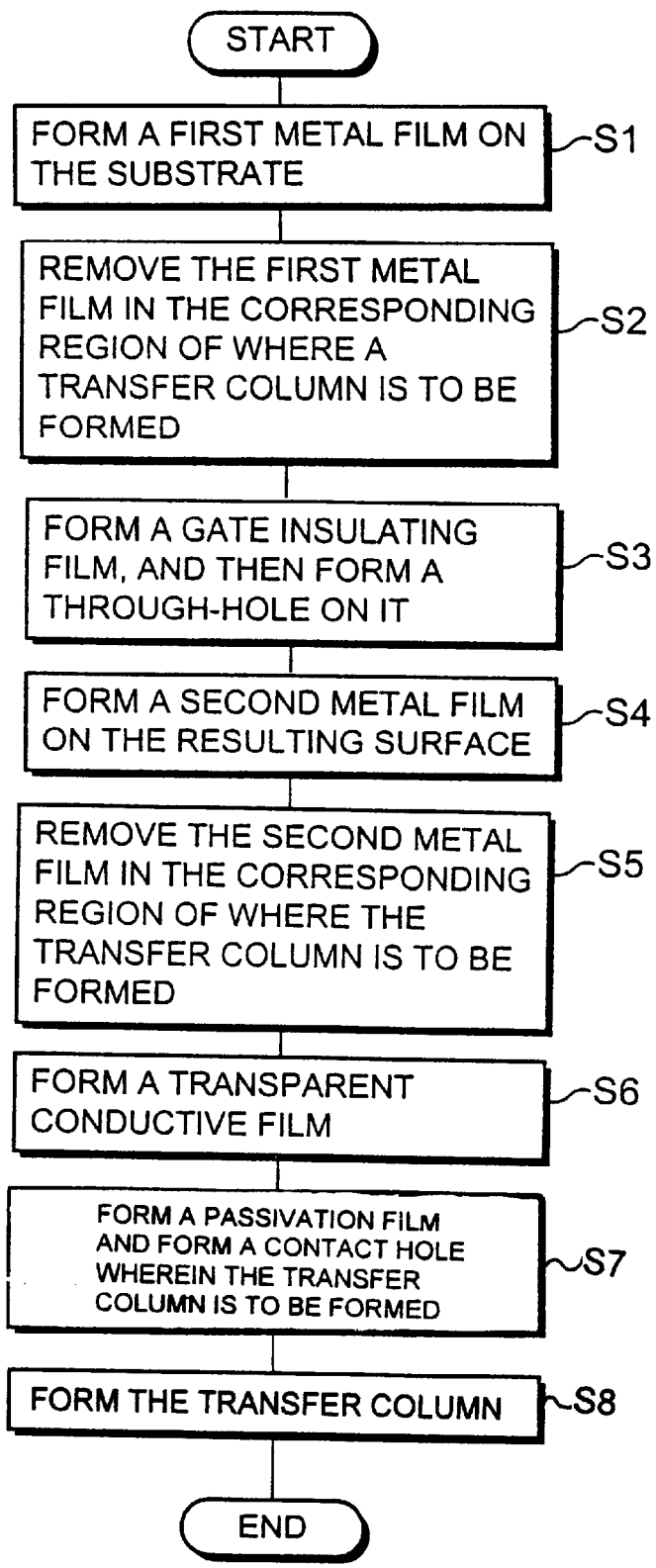
FIG. 22 is a flowchart showing a method of manufacturing the liquid crystal display device, according to the first embodiment of the present invention.

In FIGS. 13, 14, and 22, a first metal film 301, which is made of a metal such as Cr or Al, is first formed on top of a glass substrate 101 (step S1 in FIG. 22). It is then patterned into a fixed shape. At this point, the first metal film 301, in the corresponding region of where a transfer column 24 is to be formed, is removed (step 2 in FIG. 22). In addition, the gate electrodes of TFTs (not shown in the Figures), accumulation capacitor electrodes (not shown in the Figures), and gate bus lines (not shown in the Figures) are all formed by using the same material as the first metal film 301 and the same patterning process. A gate insulating film 14, made of a material such as silicon oxide or silicon nitride, a channel layer (not shown in the Figures), made of intrinsic semiconductor non-crystalline silicon (hereafter. [a-Si (I)], and a contact layer (not shown in the Figures) made of n-type semiconductor non-crystalline silicon (hereafter, [a-Si (n+)]), are consecutively formed next. Thereafter, the unwanted regions of the channel layer (not shown in the Figures) and the contact layer (not shown in the Figures) are selectively etched off.

Next, the patterning process etches off part of the gate insulating film 14, so as to form a through-hole 9, which will later be used to electrically connect the first metal film 301 to a to-be-formed, second metal film (step 3 in FIG. 22). A second metal film 303, made of a metal such as Cr or Al, is then formed on the resulting surface in the same manner as the first metal film 301 is done (step S4 in FIG. 22). Here, in the same way as the first metal film 301, the second metal film 303, which is in the corresponding region of where transfer column 24 is later to be formed, is removed (step S5 in FIG. 22). In addition, drain and source electrodes of TFTs (not shown in the Figures) and the drain bus lines (not shown in the Figures) are formed by using the same material as the second metal film 303 and the same patterning process.

Thereafter, a transparent conductive film 306, made of a transparent conductive material such as ITO, is formed through a patterning process, so as to cover the top of the second metal film 303 (step S6 in FIG. 22). Also, using both the same material as the transparent conductive film 306 and the same patterning process, a pixel electrode (not shown in the Figures), which is connected to its corresponding TFTs source electrode (not shown in the Figures), is formed. Part of the contact layer (not shown in the Figures) corresponding to its channel layer, is then etched off. Afterwards, a passivation film 15. made of a material such as silicon nitride, is formed on a transfer pad (step S7 in FIG. 22). In result, the fabrication of the TFTs array substrate 100 is then completed.

Here, in order to electrically connect the transfer pad and the transfer column 24, the passivation film 15 which is formed on the transparent conductive film 306, is removed (step S7 in FIG. 22). That is to say, as shown in FIGS. 13 and 14, a passivation film aperture region is provided to the passivation film 15, on the transparent conductive film 306. Also, the transfer pad of this embodiment is connected to the common voltage input terminal 33, via either one or both of the first and second metal films 301 and 303.

Hereafter, the manufacturing method of a liquid crystal display panel of this embodiment will be described with reference to FIGS. 14 and 15.

First, a black matrix, made of low reflective materials such as the metal CrOx and black resin, and a coloring layer, are formed on a glass substrate 21. At this time, a window to confirm the existence or non-existence and shape of a transfer column is not formed on the black matrix. Namely, in order to form this window, it is unnecessary to remove a part of the black matrix 23, so that almost all of the outer parts of the display area can be shaded. The facing electrode 22, made of a transparent conductive material such as ITO is formed on the surface of the black matrix. In result, the fabrication of a color filter substrate 20 is completed.

For each TFTs array substrate 100 and color filter substrate 20, an orientation processing film (not shown in the Figures) is formed. Next, a seal (not shown in the Figures) made of an adhesive is formed along the rim of the outer area, of the color filter substrate 20. Four transfer columns 24, each being made of a material such as silver paste, are then formed in the respective corners of the color filter substrate 20. It is noted that, each transfer column 24 is formed, so that each first and second metal film comprising a transfer pad, can be electrically connected to the corresponding, facing electrode 22, which is formed in the color filter substrate 20 (step S8 in FIG. 22). Subsequently, the two substrates mentioned above are adhered at a fixed distance apart, and after liquid crystal (not shown in the Figures) is injected in between them, it is sealed shut, and the liquid c rystal display device is complete.

A driving circuit, a case (not shown in the Figures), etc, are added to the polarizing plates 25 and 102 of the liquid crystal display panel. In result, the fabrication of a liquid crystal display device, according to the present invention, is completed. In this case, the display is viewed from the glass side of the color filter substrate 20. Also, the low reflective process is executed on the surface of the polarizing plate 25, which is attached to the color filter substrate 20.

In summary, according to the embodiment fabricated through the above manufacturing steps, it is unnecessary to form a transfer column-monitoring window on the black matrix 23, which is formed in the color filter substrate 20. Instead, a transfer column-monitoring window is formed, resulting from the removal of the region within the first and second metal films, which comprise the transfer pad, formed on the TFTs array substrate, where the transfer column 2-1 will later be formed.

Accordingly, even after the fabrication of the liquid crystal display device (i.e., after the TFTTs array substrate 100 and the color filter substrate 20 are adhered at a fixed distance apart.) the existence or non-existence and shape of the transfer column 24 is observable from the glass side of the TFTs array substrate 100, without depreciating its appearance, which makes it easy to examine the forming process of the transfer column for poor conditions, etc.

Moreover, in the first embodiment, since the TFTs and the transfer pad are both formed on the TFTs array substrate by using the same materials and patterning process, a new process is unnecessary.

(Second Embodiment)

Hereafter, the structures of the transfer pad, formed on a TFTs array substrate, and a liquid crystal display device, according to the second embodiment of the present invention, will be described.

Figure 16:
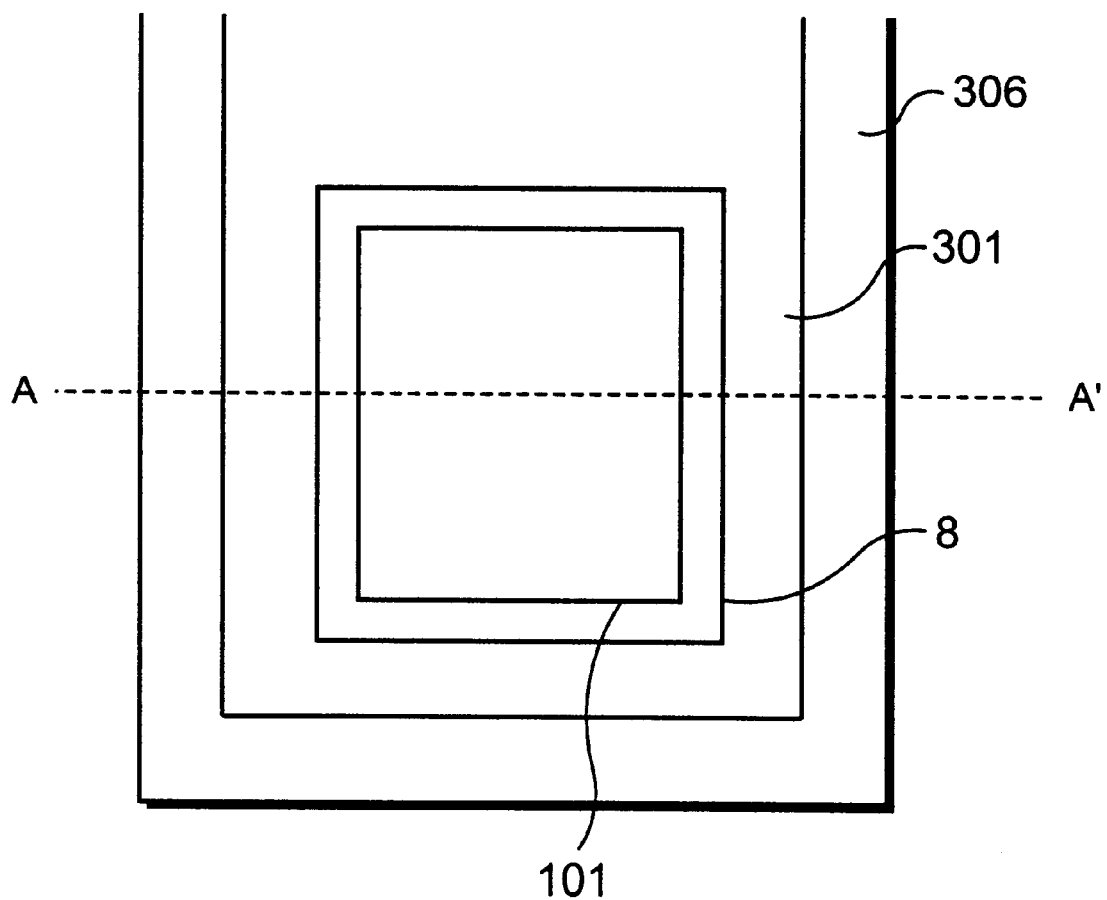
FIG. 16 is a plan illustrating the structure of the transfer pad, formed on the TFTs array substrate, according to a second embodiment of the present invention.
Figure 17:
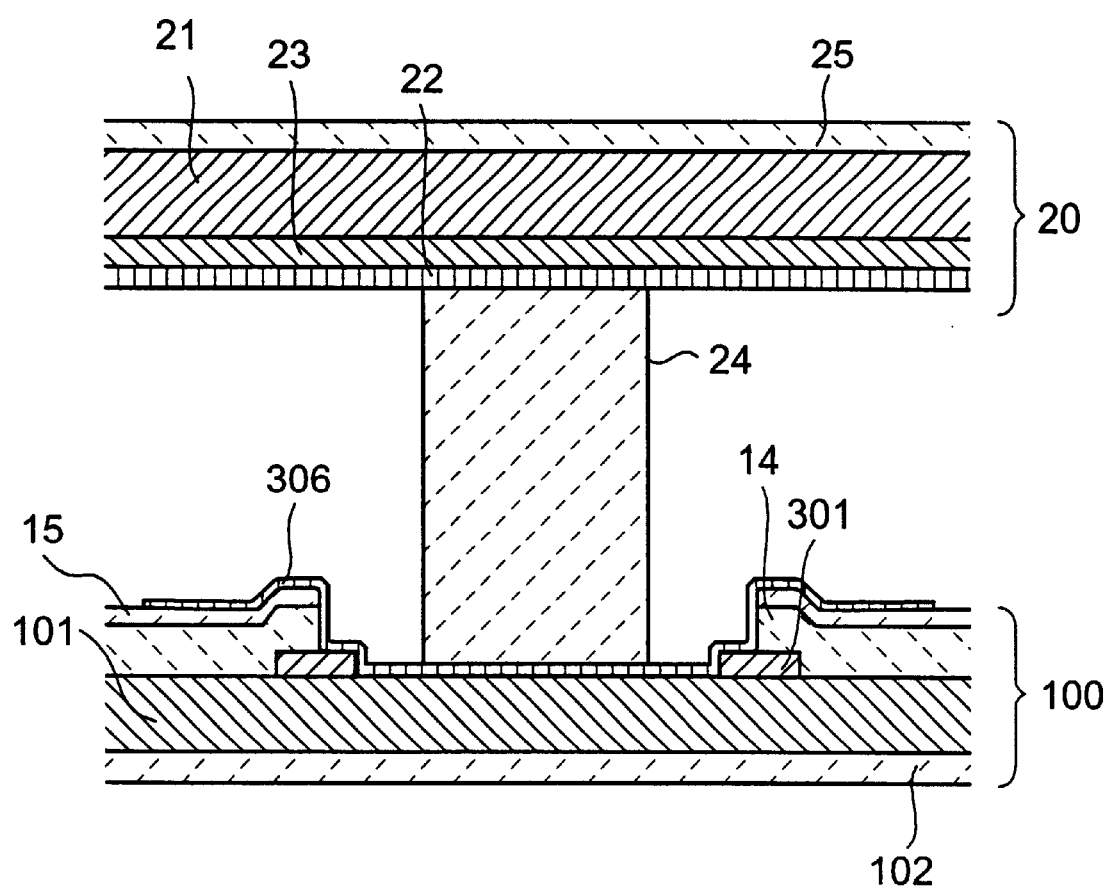
FIG. 17 is a cross section of FIG. 16 cut along the line A–A'.

FIG. 16 is a plan illustrating the formation of the transfer pad, formed on the TFTs array substrate, according to the second embodiment, whereas FIG. 17 is a cross section of FIGS. 15 and 16 cut along the line A–A'.

First, the manufacturing method and structure of the transfer pad, formed on the TFTs array substrate, will be described with reference to FIGS. 16, 17, and 23. It is noted that the TFTs and the transfer pad are both formed on the TFTs array substrate by using the same materials and patterning process.

Figure 23:
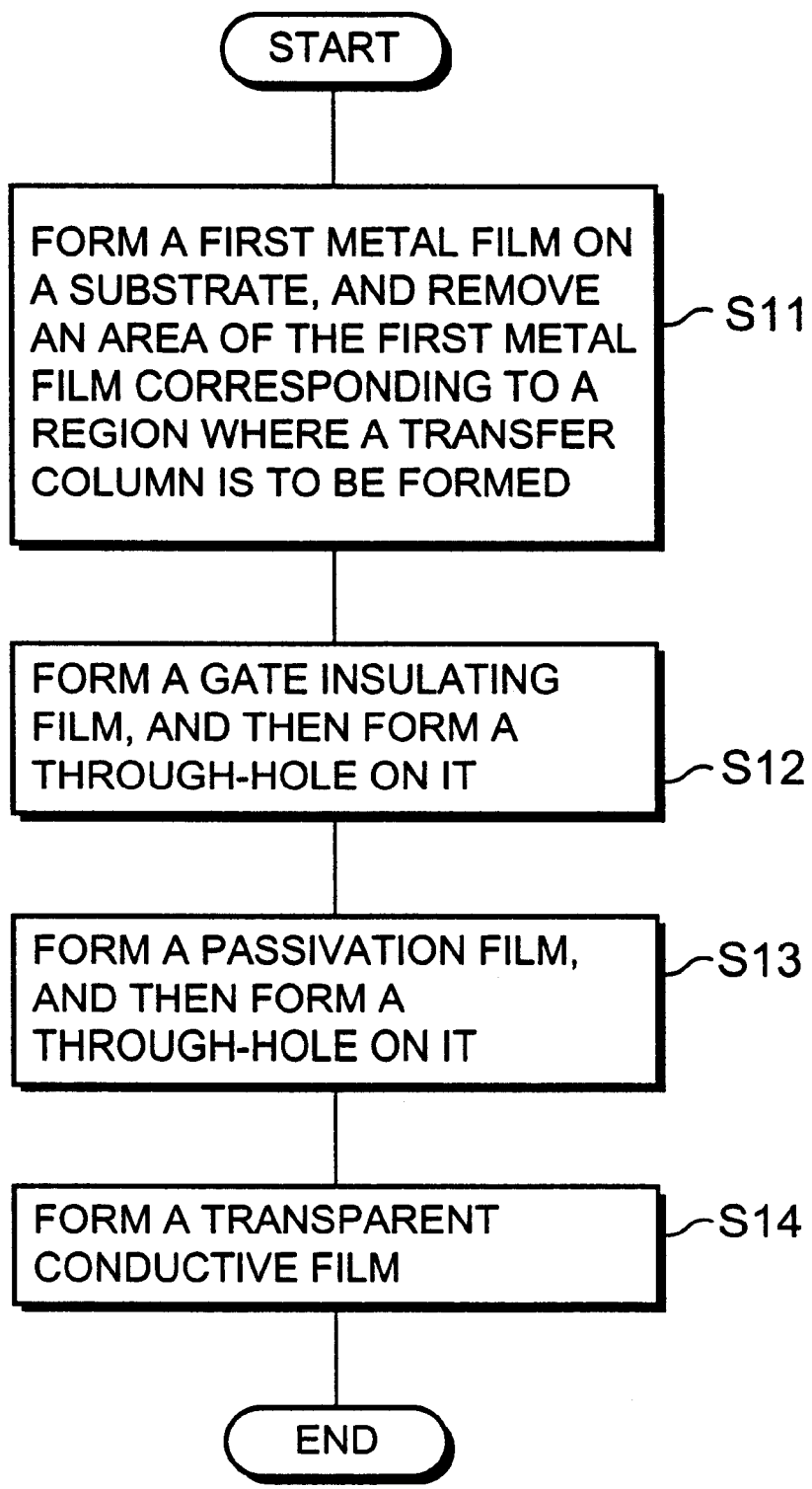
FIG. 23 is a flowchart showing a method of manufacturing the liquid crystal display device, according to the second embodiment of the present invention.

In FIGS. 16, 17, and 23, a first metal film 301, made of a metal such as Cr or Al, is first patterned and formed into a fixed shape on a glass substrate 101. At this point, the first metal film 301, in the corresponding region of where a transfer column 24 is to be formed, is removed (step S11 in FIG. 23). In addition, gate electrodes of TFTs (not shown in the Figures), accumulation capacitor electrodes (not shown in the Figures), and gate bus lines (not shown in the Figures), are all formed by using the same material as the first metal film 301 and the same patterning process as used in the first embodiment. A gate insulating film 14, made of a material such as silicon oxide or silicon nitride, a channel layer (not shown in the Figures) made of a-Si (I), and a contact layer (not shown in the Figures) made of a-Si (n+), are then consecutively formed. Thereafter, the unwanted regions of the channel layer (not shown in the Figures) and the contact layer (not shown in the Figures) are both selectively etched off.

Next, the patterning process etches off part of the gate insulating film 14, so as to form a through-hole 8, which is used to electrically connect the first metal film 301 to a to-be-formed. transparent conductive film 306 (step S12 in FIG. 23). TFTs drain and source electrodes (not shown in the Figures), made of a metal such as Cr or Al, and drain bus lines (not shown in the Figures) are all then patterned and formed on the resulting surface from step S12. Next, part of each contact layer (not shown in the Figures), which is formed on top of its corresponding TFT channel layer, is etched off. A passivation film 15, made of a material such as silicon nitride, is then formed (step S13 in FIG. 23). A through-hole that will be later used to electrically connect the first metal film 301 to a to-be-formed, transparent conductive film 306 is formed next, on the formed passivation film 15. It is noted that, in FIG. 16, the through-hole formed on each gate insulating film 14 and passivation film 15 are collectively recorded as the through-hole 8.

Thereafter, a transparent conductive film 306, made of a transparent conductive material such as ITO, is patterned and formed, so as to cover the top of the first metal film 301, and is simultaneously made to be a transfer pad (step S14 in FIG. 23). In result, the fabrication of a TFTs array substrate 100 is complete. Also, the transfer pad of the present embodiment is connected to the common voltage input terminal 33, via the first metal film 301.

The structure and manufacturing method of the liquid crystal display panel of the second embodiment, is the same as those of the first embodiment. In this case as well, a window to confirm the existence or non-existence and shape of a transfer column is not formed on the black matrix of the color filter substrate 20. Namely, in order to form this window, it is unnecessary to remove a part of the black matrix 23 so that almost all of the outer parts of the display area can be shaded.

According to the second embodiment fabricated, in the same way as the first embodiment, through the above manufacturing steps, it is unnecessary to form a transfer column-monitoring window on the black matrix 23 of the color filter substrate 20. Thus, the reflection of the transfer column 24 does not depreciate the quality of its appearance.

Also, in the first metal film 301, which forms the transfer pad on the TFTs substrate 100, since the region where the transfer column 24 is to be formed is removed, this part works as a transfer column-monitoring window. Accordingly, even after the fabrication of the liquid crystal display device (i.e., after the TFTs array substrate 10 and color filter substrate 20 are adhered at a fixed distance apart.) the existence or non-existence and shape of the transfer column 24 is observable from the viewpoint of the glass side of the TFTs array substrate 100, and the forming process of the transfer column is easily examined for poor conditions, etc.

Moreover, in the second embodiment, since the TFTs and the transfer pad are both formed on the TFTs array substrate by using the same materials and patterning process, a new process is unnecessary.

(Third Embodiment)

Hereafter, the structure of a transfer pad, formed on a TFTs array substrate, and a liquid crystal display device, according to the third embodiment of the present invention, will be described.

Figure 18:
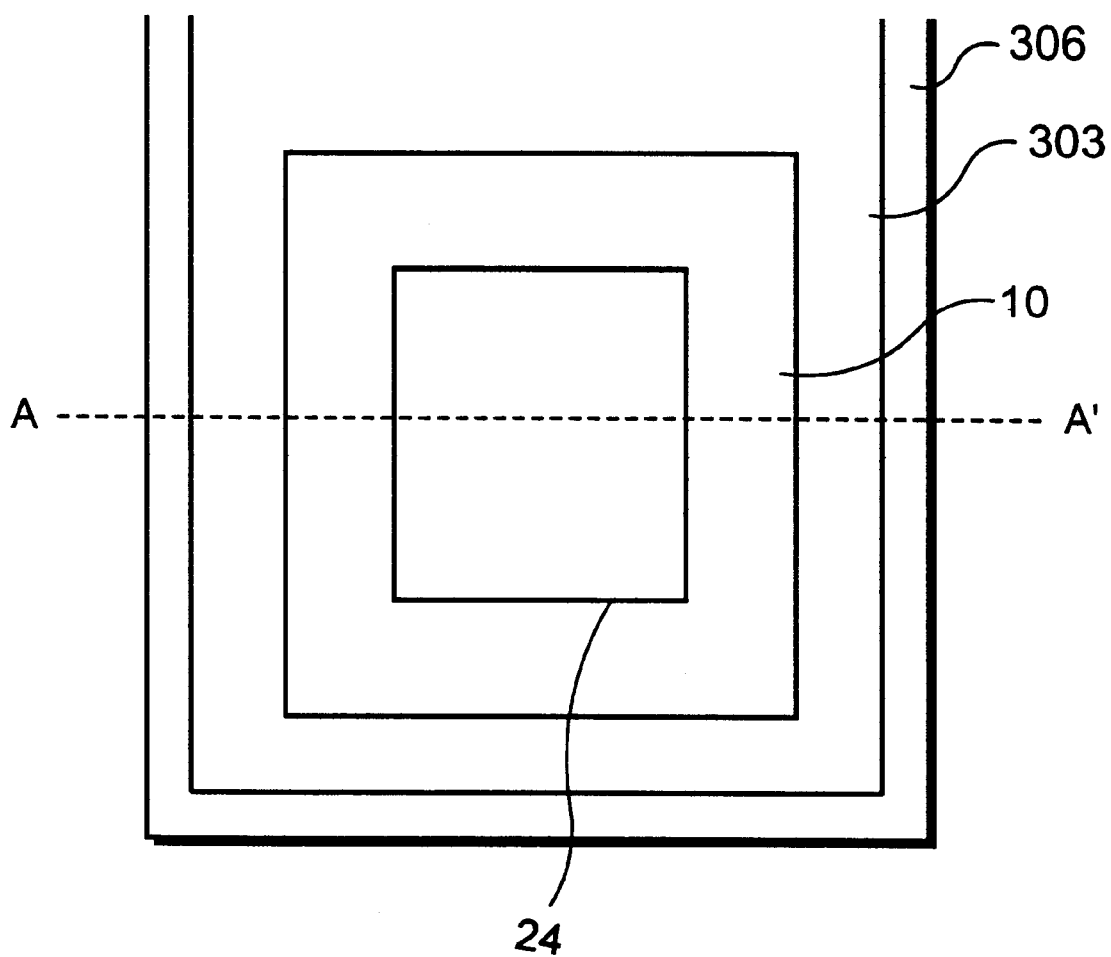
FIG. 18 is a plan illustrating the structure of the transfer pad, formed on the TFTs array substrate, according to a third embodiment of the present invention.
Figure 19:
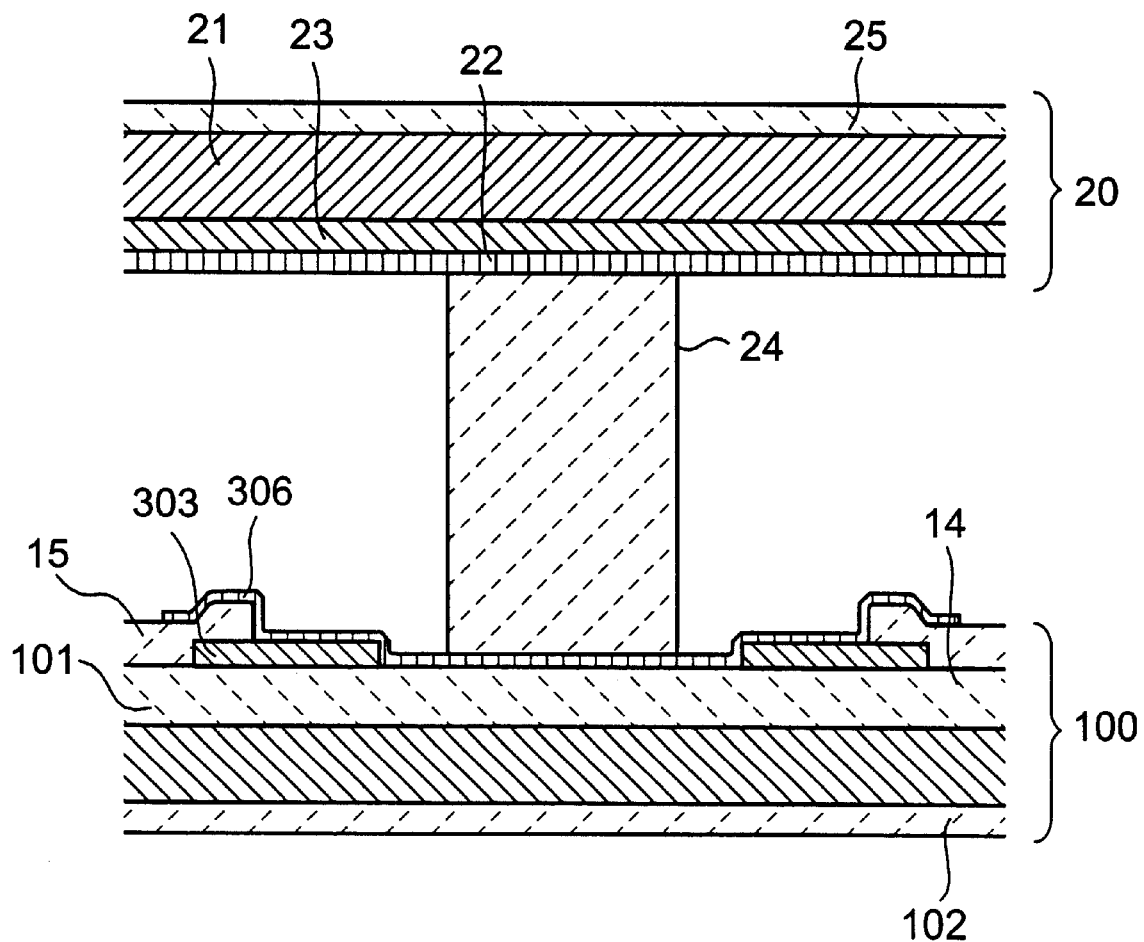
FIG. 19 is a cross section of FIG. 18 cut along the line A–A'.

FIG. 18 is a plan illustrating the structure of the transfer pad, formed on the TFTs array substrate, according to the third embodiment, whereas FIG. 19 is a cross section of FIGS. 15 and 18 cut along the line A–A'.

First, the manufacturing method and structure of the transfer pad, formed on a TFTs array substrate 100, will be described with reference to FIGS. 18, 19, and 24. It is noted that TFTs and the transfer pad are both formed on the TFTs array substrate 100, by using the same materials and patterning process.

Figure 24:
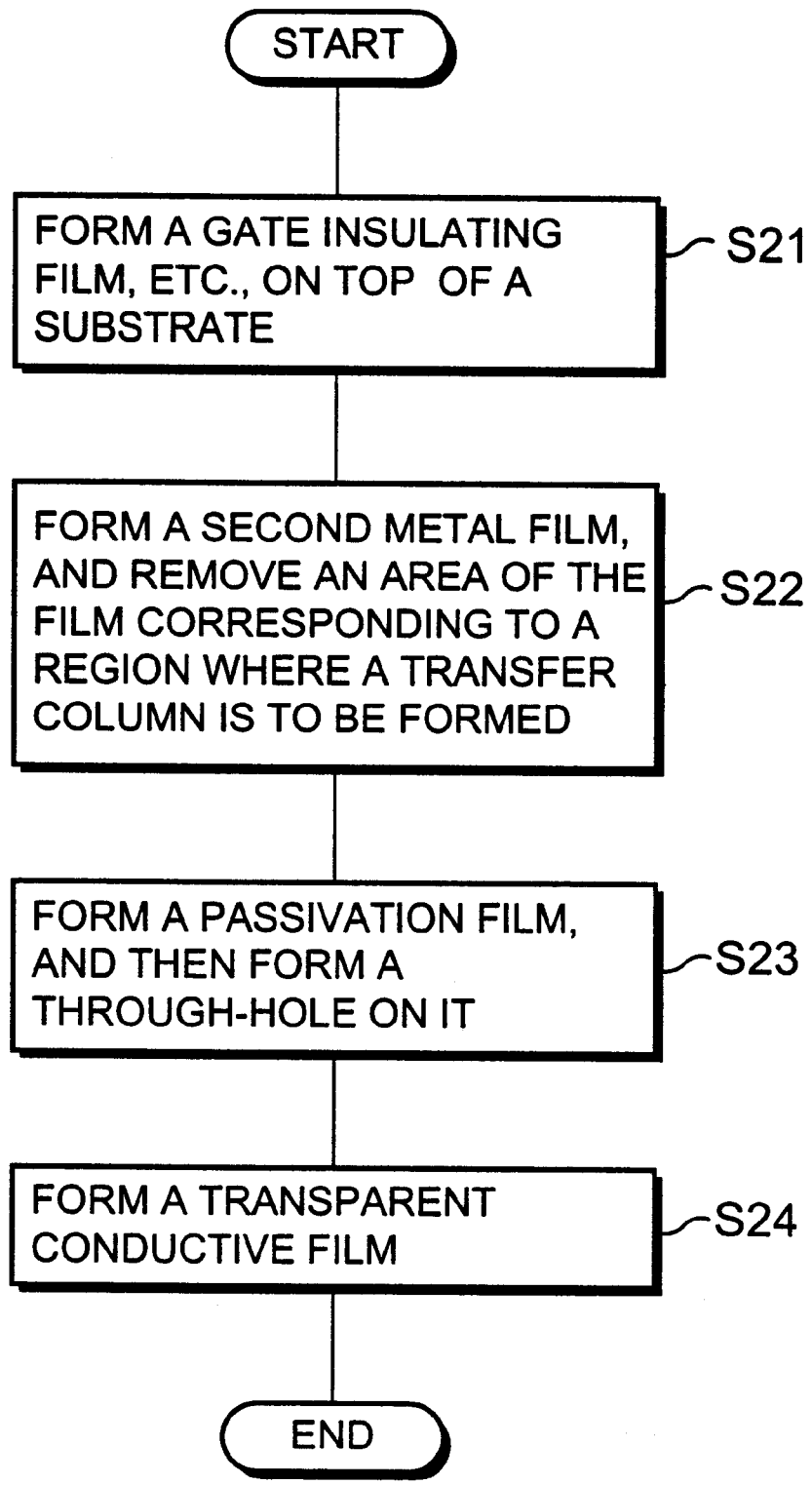
FIG. 24 is a flowchart showing a method of manufacturing the liquid crystal display device. according to the third embodiment of the present invention.

In FIGS. 18, 19, and 24, TFTs gate electrodes (not shown in the Figures) made of a metal such as Cr or Al, accumulation capacitor electrodes (not shown in the Figures), and gate bus lines (not shown in the Figures) are all patterned and formed on a glass substrate 101. On top of this, a gate insulating film 14, made of a material such as silicon oxide or silicon nitride, a channel layer (not shown in the Figures) made of a-Si (I), and a contact layer (not shown in the Figures), made of a-Si (n+), are consecutively foirmed (step S21 in FIG. 24). Thereafter, the unwanted regions of the channel layer (not shown in the Figures) and the contact layer (not shown in the Figures) are selectively etched off. A through-hole (not shown in the Figures), which will later be used to electrically connect a to-be-formed, second metal film 303 to a to-be-formed, transparent conductive film 306, is then formed. A second metal film 303, made of a metal such as Cr or Al, is patterned and formed on top of the gate insulating film 14. At this time, the second metal film 303, in the corresponding region to where a transfer column 24 is to be formed, is removed (step S22 in FIG. 24). In addition, TFTs drain and source electrodes (not shown in the Figures) and drain bus lines (not shown in the Figures), made of the same materials and patterning process as the second metal film 303, are all formed.

Next, part of each contact layer (not shown in the Figures), which is formed on top of its corresponding TFT channel layer, is etched off. A passivation film 15, made of a material such as silicon nitride, is then formed. Next, a through-hole 10 that will be used to electrically connect the second metal film 303 to a to-be-formed, transparent conductive film 306 is formed (step S23 in FIG. 23). On this resulting surface, a transparent conductive film 306 is patterned and formed, so as to cover the top of the second metal film 303, and is simultaneously made into a transfer pad (step S24 in FIG. 24). In result, the TFTs array substrate 100 is complete. In addition, the transfer pad formed is connected to the common voltage input terminal 33 via the second metal film 303.

The structure and manufacturing method of the liquid crystal display panel, according to the third embodiment, is the same as of the first embodiment. In this case as well, a window to confirm the existence or non-existence and shape of a transfer column is not formed on the black matrix of the color filter substrate 20. Namely, in order to form this window, it is unnecessary to remove a part of the black matrix 23, so that almost all of the outer parts of the display area can be shaded.

According to the third embodiment, fabricated in the same way as the first embodiment, through the above manufacturing steps, it is unnecessary to form a transfer column-monitoring window on the black matrix 23 of the color filter substrate 20. Thus, the reflection of the transfer column 24 does not depreciate the quality of its appearance.

Also, in the second metal film 303, which forms the transfer pad on the TFTs substrate 100, since the region where the transfer column 24 is to be formed is removed, this part works as a transfer column-monitoring window. Accordingly, even after the fabrication of the liquid crystal display device (i.e., after the TFTs array substrate 10 and color filter substrate 20 are adhered at a fixed distance apart.) the existence or non-existence and shape of the transfer column 24 is observable from the viewpoint of the glass side of the TFTs array substrate 100. In addition, the forming process of the transfer column is easily examined for poor conditions, etc.

Moreover, in the third embodiment, since the TFTs and the transfer pad are both formed on the TFTs array substrate by using the same materials and patterning process, a new process is unnecessary.

(Fourth Embodiment)

Hereafter, the structure of a transfer pad, formed on the TFTs array substrate 100, according to the fourth embodiment of the present invention, will be described.

Figure 20:
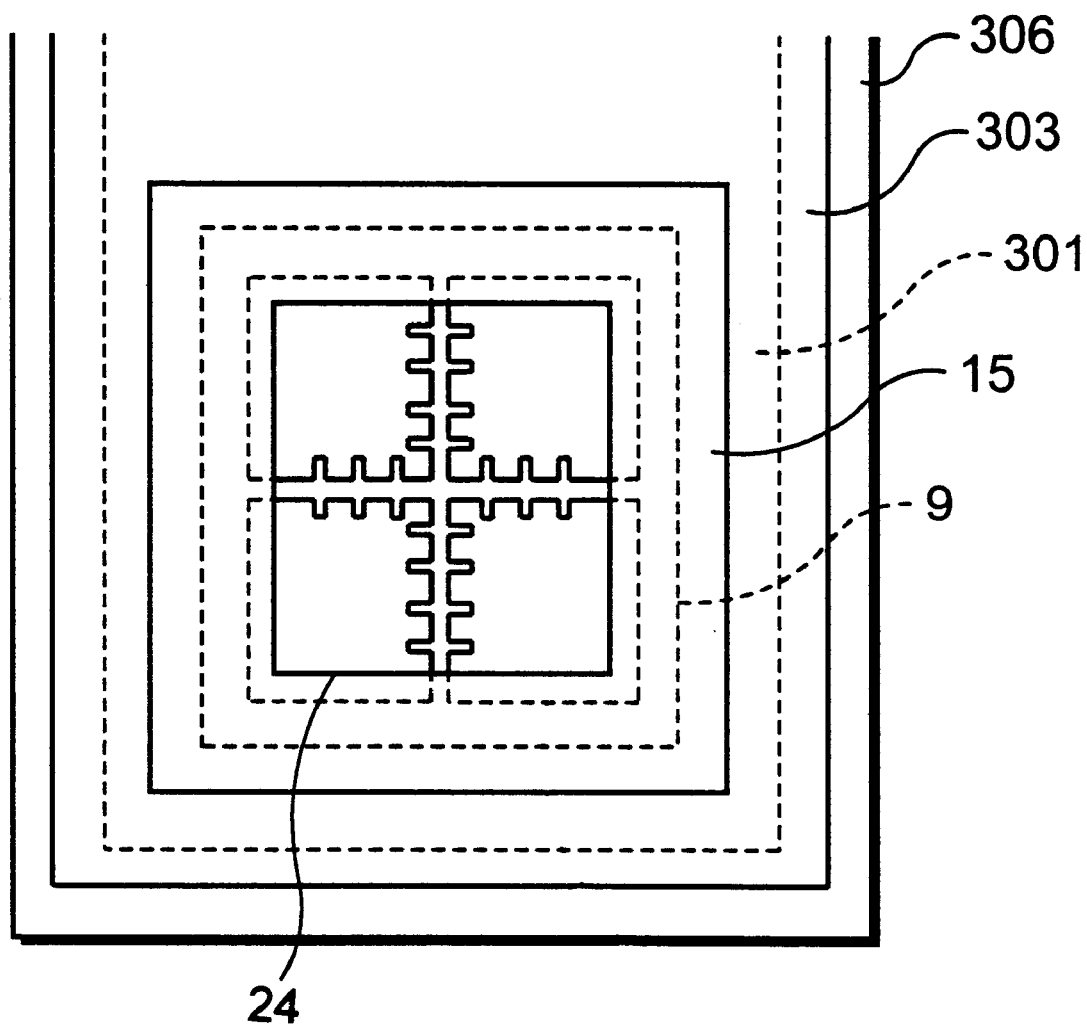
FIG. 20 is a plan illustrating the structure of the transfer pad, formed on the TFTs array substrate, according to a fourth embodiment of the present invention.

FIG. 20 is a plan illustrating the formation of the transfer pad, formed on the TFTs array substrate 100, according to the fourth embodiment.

The structure and manufacturing method of the transfer pad and liquid crystal display device, according to the fourth embodiment, is the same as those of the first embodiment. A characteristic of the fourth embodiment is that the first metal film 301, which forms the transfer pad, is removed, and a vernier scale, which measures the dimensions of the transfer column and made of the first metal film 301, is added. Accordingly, the transfer column-monitoring window is unnecessary. Through the addition of this vernier scale, even after fabrication of the liquid crystal display device (i.e., after the TFTs array substrate 100 and the color filter substrate 20 are adhered at a fixed distance apart,), the existence or non-existence and shape of the transfer column 24 is observable from the glass side of the TFTTs array substrate 100. At the same time, the dimensions of the completed transfer column are easily measured.

The above vernier scale can be alternatively formed in such a manner that the first metal film 301 is partially removed, so as to form a transfer pad with a vernier scale.

(Fifth Embodiment)

Hereafter, the structure of a transfer pad, formed on the TFTs array substrate, according to the fifth embodiment of the present invention, will be described.

Figure 21:
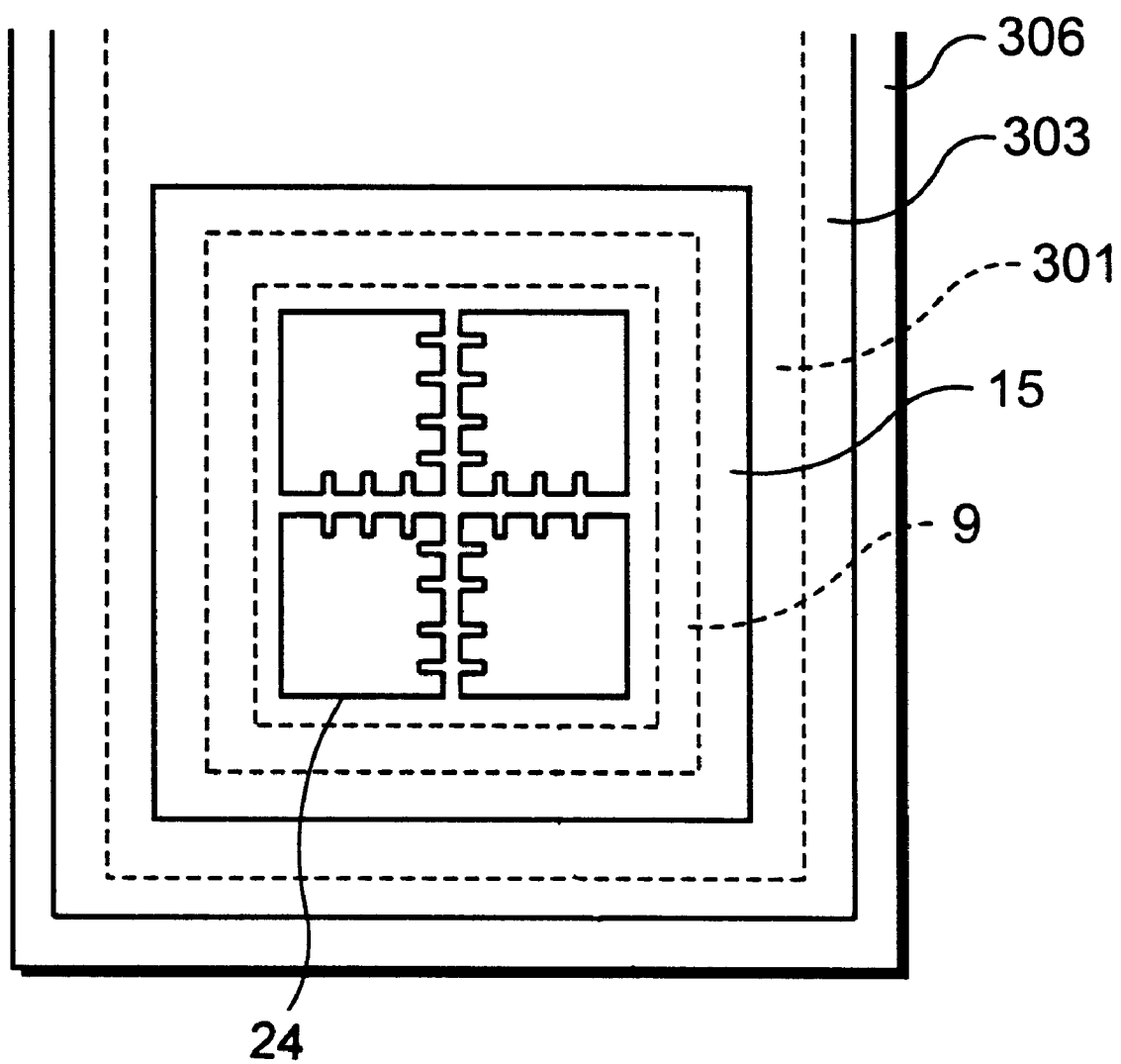
FIG. 21 is a plan illustrating the structure of the transfer pad, formed on the TFTs array substrate, according to a fifth embodiment of the present invention.

FIG. 21 is a plan illustrating the formation of the transfer pad, formed on the TFTs array substrate 100, according to the fifth embodiment.

The structure and manufacturing method of the transfer pad and liquid crystal display device, of the fifth embodiment, is the same as those of the first embodiment.

A characteristic of the fifth embodiment is that the second metal film 303, which forms the transfer pad, is removed, and a vernier scale, which measures the dimensions of the transfer column and made of the first metal film 301, is added. Accordingly, the transfer column-monitoring window is unnecessary. Through the addition of this vernier scale, even after fabrication of the liquid crystal display device (i.e., after the TFTs array substrate 100 and the color filter substrate 20 are adhered at a fixed distance apart,), the existence or non-existence and shape of the transfer column 24 is observable from the glass side of the TFTs array substrate 100. At the same time, the dimensions of the completed transfer column are easily measured.

Incidentally, the above vernier scale can be alternatively formed in such a manner that the second metal film 303 is partially removed, so as to form a transfer pad with a vernier scale.

Furthermore, the addition of the dimension-measuring vernier scale, described in the fourth and fifth embodiments, and formed by using either the first metal film 301 or the second metal film 303, is also applicable to the second and third embodiments.

The preferred embodiments have been described above, however, the present invention is not limited to these embodiments, and various changes are possible, within the spirit and scope of the claims of this invention. For example, the first and second metal films etc, can be made of other metal materials or complex films, and the gate insulating film and passivation film can be formed of various insulating or complex films.

What is claimed is:

1. A liquid crystal display device, comprising:
   a first substrate having gate bus lines made of first metal, drain bus lines made of second metal, a transfer pad, a transparent conductive film consisting of a transparent conductive material and electrically connected to said transfer pad,
   a second substrate having a black matrix, a common electrode consisting of a transparent conductive material and formed on said black matrix,
   a transfer column formed between said transfer pad and said common electrode to be electrically connected thereto; and
   a liquid crystal sandwiched between said first substrate and said second substrate,
   wherein an area of said transfer pad, where said transfer column is formed, is removed.

2. The liquid crystal display device, according to claim 1, wherein said transfer pad is made of said first metal and said second metal.

3. The liquid crystal display device, according to claim 1, wherein an area of said transfer pad, where said transfer column is formed, is partially removed so as to be shaped into a Vernier scale.

4. A method of manufacturing a liquid crystal display device, comprising the steps of:
   forming gate bus lines and a transfer pad made of first metal on a first substrate;
   forming a gate insulating film to conver said gate bus lines;
   etching off a part of said gate insulating film to form a through-hole;
   forming drain bus lines made of second metal on said first substrate;
   forming a transparent conductive film made of transparent conductive material so as to be electrically connected to said transfer pad;
   forming a black matrix on a second substrate;
   forming a common electrode consisting of transparent conductive material on said black matrix;
   forming a transfer column between said transfer pad and said common electrode to be electrically connected thereto; and
   sandwiching a liquid crystal between said first substrate and said second substrate;
   wherein an area of said transfer pad corresponding to a region where said transfer column is formed is removed.

* * * * *

UNITED STATES PATENT AND TRADEMARK OFFICE
CERTIFICATE OF CORRECTION

| | | |
|---|---|---|
| PATENT NO. | : 6,268,898 B1 | Page 1 of 1 |
| APPLICATION NO. | : 09/391151 | |
| DATED | : July 31, 2001 | |
| INVENTOR(S) | : Hirofumi Ihara | |

It is certified that error appears in the above-identified patent and that said Letters Patent is hereby corrected as shown below:

IN THE TITLE at (54), and also at Column 1, Line 1:

Delete "LIQUID CRYSTAL DISPLAY DEVICE AND METHOD OF MANUFACTURING THE SAME" and replace with "LIQUID CRYSTAL DISPLAY DEVICE WITH A TRANSFER COLUMN-MONITORING WINDOW AND METHOD OF MANUFACTURING THE SAME".

Signed and Sealed this
Twenty-sixth Day of July, 2011

David J. Kappos
*Director of the United States Patent and Trademark Office*